US007577788B2

(12) United States Patent
Murotani et al.

(10) Patent No.: US 7,577,788 B2
(45) Date of Patent: Aug. 18, 2009

(54) DISK ARRAY APPARATUS AND DISK ARRAY APPARATUS CONTROL METHOD

(75) Inventors: Akira Murotani, Odawara (JP); Atsushi Ishikawa, Odawara (JP); Tetsuya Kishimoto, Odawara (JP)

(73) Assignee: Hitachi, Ltd, Tokyo (JP)

( * ) Notice: Subject to any disclaimer, the term of this patent is extended or adjusted under 35 U.S.C. 154(b) by 0 days.

(21) Appl. No.: 11/376,121

(22) Filed: Mar. 16, 2006

(65) Prior Publication Data

US 2006/0161732 A1 Jul. 20, 2006

Related U.S. Application Data

(63) Continuation of application No. 10/821,888, filed on Apr. 12, 2004, now Pat. No. 7,017,003.

(30) Foreign Application Priority Data

Feb. 16, 2004 (JP) ............................. 2004-038169

(51) Int. Cl.
*G06F 12/00* (2006.01)
(52) U.S. Cl. ....................... 711/114; 711/161; 711/162; 711/170; 711/173
(58) Field of Classification Search .................. None
See application file for complete search history.

(56) References Cited

U.S. PATENT DOCUMENTS

| 6,141,773 | A | 10/2000 | St. Pierre et al. |
|---|---|---|---|
| 6,195,695 | B1 | 2/2001 | Cheston et al. |
| 6,311,193 | B1* | 10/2001 | Sekido ........................ 707/202 |
| 6,463,501 | B1 | 10/2002 | Kern et al. |
| 6,526,419 | B1 | 2/2003 | Burton et al. |
| 6,611,901 | B1 | 8/2003 | Micka et al. |
| 6,820,180 | B2 | 11/2004 | McBrearty et al. |
| 6,826,666 | B2 | 11/2004 | Berkowitz et al. |
| 6,829,688 | B2* | 12/2004 | Grubbs et al. ................ 711/162 |
| 6,898,681 | B2 | 5/2005 | Young |
| 6,912,632 | B2 | 6/2005 | Mori |
| 6,915,397 | B2* | 7/2005 | Lubbers et al. .............. 711/162 |
| 6,938,135 | B1* | 8/2005 | Kekre et al. .................. 711/162 |
| 6,978,354 | B1* | 12/2005 | Kekre et al. .................. 711/162 |
| 7,020,760 | B2* | 3/2006 | Glider ......................... 711/202 |
| 2003/0005235 | A1* | 1/2003 | Young ......................... 711/141 |

(Continued)

*Primary Examiner*—Pierre-Michel Bataille
*Assistant Examiner*—Shawn X Gu
(74) *Attorney, Agent, or Firm*—Stites & Harbison PLLC; Juan Carlos A. Marquez, Esq.

(57) ABSTRACT

A journal write unit writes journal data into a third storage device. The journal data includes an identifier of a logical volume in a first storage device into which data has been written, information of a location in which the data is stored in the logical volume, update time which is current time acquired from a timing mechanism, and the data. A second write unit refers to update time of the journal data stored in the third storage device, selects journal data for which a difference between current time acquired from the timing mechanism and the update time is longer than a detection time stored in the third storage device, and writes the data into a place indicated by the location information, in a logical volume in the second storage device in the order of update time in the selected journal data.

22 Claims, 18 Drawing Sheets

U.S. PATENT DOCUMENTS

2003/0131068 A1 7/2003 Hoshino et al.
2003/0177149 A1 9/2003 Coombs
2004/0260735 A1 12/2004 Martinez et al.
2005/0004979 A1 1/2005 Berkowitz et al.

* cited by examiner

FIG.15

| PRIMARY LOGICAL VOLUME | SECONDARY LOGICAL VOLUME |
|---|---|
| LU#01 | LU#11 |
| LU#02 | LU#12 |
| LU#03 | LU#13 |
| LU#04 | LU#14 |
| ⋮ | ⋮ |

| LOGICAL VOLUME | GROUP ID |
|---|---|
| LU#01 | 1 |
| LU#02 | 1 |
| LU#03 | 2 |
| LU#04 | 2 |
| ⋮ | ⋮ |

1601

| LOGICAL VOLUME | VIRTUAL LOGICAL VOLUME |
|---|---|
| LU#11 | LU#21 |
| LU#12 | LU#22 |
| LU#13 | LU#23 |
| LU#14 | LU#24 |
| ⋮ | ⋮ |

1901

DISK ARRAY APPARATUS AND DISK ARRAY APPARATUS CONTROL METHOD

CROSS-REFERENCE TO RELATED APPLICATION

This application is a Continuation Application of U.S. application Ser. No. 10/821,888 filed on Apr. 12, 2004 now U.S. Pat. No. 7,017,003. Priority is claimed based upon U.S. application Ser. No. 10/821,888 filed on Apr. 12, 2004, which claims the priority date of Japanese Patent Application No. 2004-038169 filed on Feb. 16, 2004, the entire contents of which is incorporated herein by reference.

BACKGROUND OF THE INVENTION

The present invention relates to a disk array apparatus and a disk array apparatus control method.

In recent years, information processing systems operated for 24 hours without halt, such as commodity sale systems using the Internet, have increased. Data used in such an information processing system are often stored in a database on a disk array apparatus as the data quantity increases and improvement of fault tolerance is requested. In information processing systems operated without halt, it is necessary to back up data stored in the database without stopping database update processing. Therefore, a method of providing a replica volume for backup in a disk array apparatus and storing data stored in the database in the replica volume for backup as well is used. It is possible to acquire a backup of the database at a certain point in time by stopping writing data into the replica volume and copying the data stored in the replica volume into an external storage medium such as magnetic tape.

U.S. Pat. No. 6,141,773 discloses resynchronization processing of writing data written into a database while writing data into a replica volume is stopped, into the replica volume after completion of backup.

While the resynchronization processing is being executed, contents of the replica volume are not ensured. In some cases, therefore, two replica volumes are provided for one database, and the two replica volumes alternately conduct the resynchronization processing. If in this case a hardware fault occurs in a data area for storing the database, the database can be recovered by using one of the replica volumes and a REDO log of the database.

Besides the hardware faults, in the database operation, illegal data is written into the database in some cases because of malfunction in software, a user's operation mistake, or the like. Such a fault is called software fault. If a software fault occurs, it is necessary to restore data at a certain point in time preserved on magnetic tape or the like, and recover the database by using the restored data and REDO log. Since a considerably long time is required to restore data from the magnetic tape or the like, the halt time of the system becomes long.

When a software fault has occurred, therefore, it is demanded to recover the database quickly by using data in the disk array apparatus without restoring data from the external storage medium such as magnetic tape. In the case where the above-described two replica volumes are used, a storage capacity which is three times that of the volume storing the database becomes necessary, and the cost required to introduce a disk array apparatus increases.

Therefore, it is demanded to reduce the storage capacity required to back up the database against a hardware fault or a software fault.

Furthermore, in the resynchronization processing, it is necessary to read out data to be written into the replica volume from the database. This results in a problem that the performance of external access to the database is degraded during the resynchronization processing. Therefore, it is demanded to quickly recover the database without lowering the performance of external access to the database.

Furthermore, apart from the quick recovery of the database, it is demanded to acquire a backup at a certain point in time to provide against an emergency, without stopping the database update processing.

SUMMARY OF THE INVENTION

The present invention has been achieved in order to solve the above-described problems.

It is a main object of the present invention to provide a disk array apparatus and a disk array apparatus control method capable of reducing the storage capacity required to back up the database against a hardware fault or a software fault, quickly restoring the database without lowering the performance of external access to the database, and acquiring a backup at a certain point in time to provide against an emergency, without stopping the database update processing.

In accordance with a main aspect of the present invention, the above-described object is achieved by a disk control apparatus connected to an information processing apparatus so as to be able to communicate with the information processing apparatus, the disk control apparatus writing/reading data into/from a first storage device having one or more logical volumes formed thereon, a second storage device having one or more logical volumes formed thereon, and a third storage device, the disk control apparatus including: a memory, association of identifiers of the logical volumes in the first storage device serving as identifiers of primary logical volumes with identifiers of the logical volumes in the second storage device serving as identifiers of secondary logical volumes being stored in the memory as a pair management table; a timing mechanism; a write request reception unit for receiving a write request of data for a logical volume in the first storage device and the data to be written, from the information processing apparatus; a first write unit responsive to reception of the write request, for writing the data into the logical volume in the first storage device; a journal write unit for writing journal data into the third storage device, the journal data comprising an identifier of the logical volume in the first storage device into which the data has been written, information of a location in which the data is stored in the logical volume, update time which is current time acquired from the timing mechanism, and the data; and a second write unit for referring to the update time of the journal data stored in the third storage device, selecting journal data for which a difference between current time acquired from the timing mechanism and the update time is longer than a predetermined time, referring to an identifier of the logical volume in the journal data, the location information and the data in order of the update time in the selected journal data, acquiring an identifier of a secondary logical volume having the identifier of the logical volume as an identifier of the primary logical volume from the pair management table, and writing the data into a place indicated by the location information, in the logical volume indicated by the identifier of the secondary logical volume, in the second storage device.

Other objects, features and advantages of the invention will become apparent from the following description of the embodiments of the invention taken in conjunction with the accompanying drawings.

BRIEF DESCRIPTION OF THE DRAWINGS

FIG. 15 is a diagram showing a pair management table according to the embodiment;

FIG. 16 is a diagram showing a group management table according to the embodiment;

DESCRIPTION OF THE EMBODIMENTS

==Disk Array Apparatus==

Figure 1:
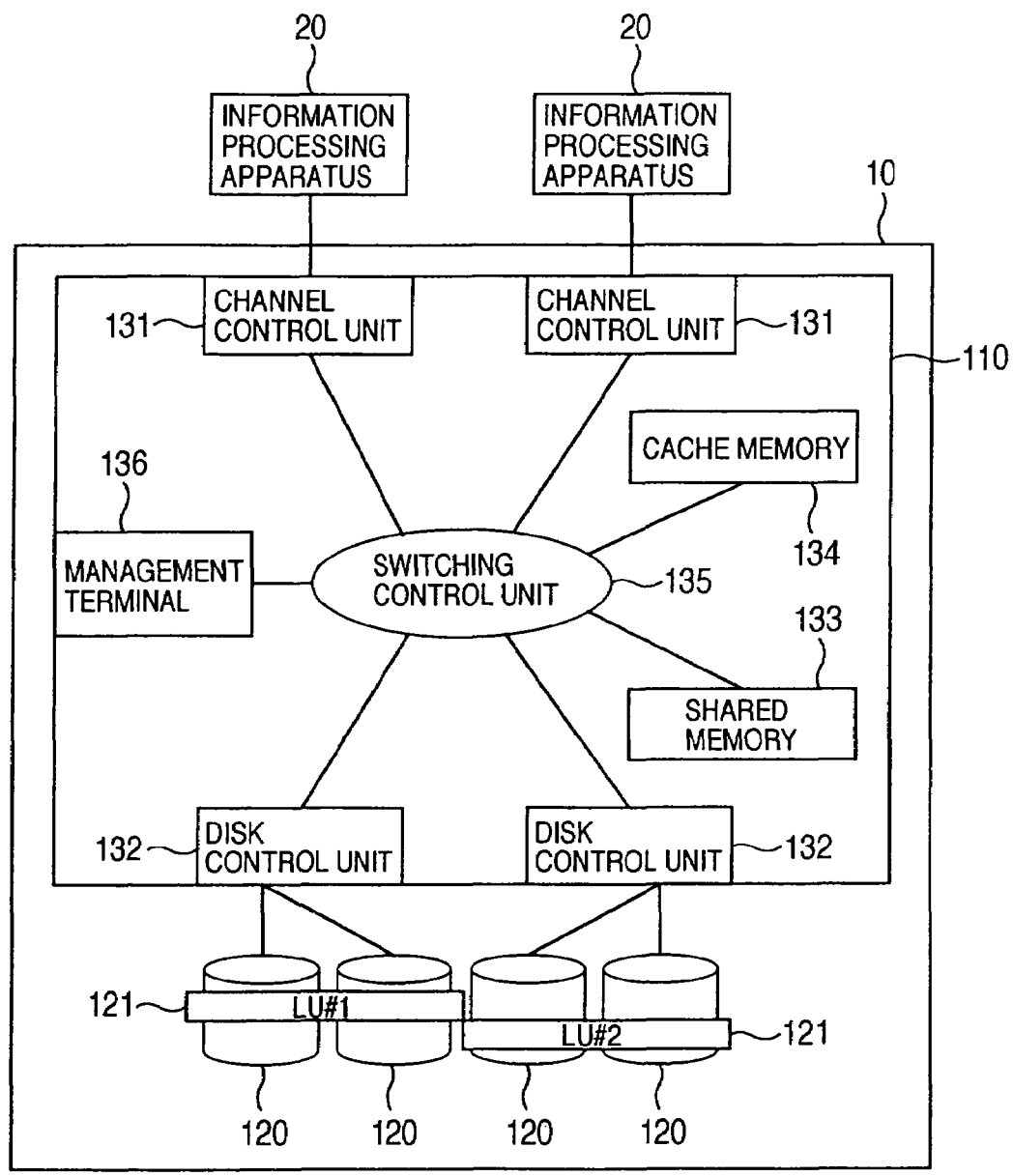
FIG. 1 is a block diagram showing a configuration of a first form of a disk array apparatus according to an embodiment.

A first form of a disk array apparatus according to an embodiment is shown in FIG. 1. The disk array apparatus 10 includes a disk control device 110 and a plurality of hard disk drives 120. The disk array apparatus 10 is connected to information processing apparatuses 20 via communication means. The communication means is, for example, a LAN (Local Area Network), a SAN (Storage Area Network), an iSCSI (Internet Small Computer System Interface), an ESCON (Enterprise Systems Connection) (registered trademark), and a FICON (Fibre Connection) (registered trademark).

The information processing apparatus 20 is a computer including a CPU (Central Processing Unit) and a memory. The information processing apparatus 20 is a computer such as a personal computer, a work station, or a main frame. The information processing apparatus 20 is formed of a plurality of linked computers in some cases. In the information processing apparatus 20, an operating system is operating. On the operating system, application software is operating. The application software provides a function of, for example, an automatic teller machine system in a bank, or an airplane seat reservation system.

The disk control device 110 takes charge of generally controlling the disk array apparatus 10. The disk control device 110 exercises control on the hard disk drives 120 in obedience to a command received from an information processing apparatus 20. For example, the disk control device 110 receives a data input/output request from an information processing apparatus 20, and conducts processing for inputting/outputting data stored in a hard disk drive 120.

The disk control device 110 includes channel control units 131, disk control units 132, a shared memory 133, a cache memory 134, a switching control unit 135 including a crossbar switch, which connects them so as to make possible communication, and a management terminal 136. The units 131 to 136 included in the disk control device 110 may have redundancy in order to increase the fault tolerance.

The cache memory 134 is mainly used to temporarily store data transferred between a channel control unit 131 and a disk control unit 132. For example, if a data input/output command received from an information processing apparatus 20 by a channel control unit 131 is a write command, the channel control unit 131 writes write data received from the information processing apparatus 20 into the cache memory 134. Furthermore, the disk control unit 132 reads the write data from the cache memory 134, and writes the write data into a hard disk drive 120. The cache memory 134 may be made nonvolatile. In this case, when data received from the information processing apparatus 20 by the channel control unit 131 has been written into the cache memory 134, a write completion notice may be transmitted to the information processing apparatus 20.

A disk control unit 132 reads a data input/output request written into the shared memory 133 by a channel control unit 131, and executes processing such as data writing or reading on a hard disk drive 120 in obedience with a command (such as a command according to the SCSI (Small Computer System Interface) standards) set in the data input/output request. The disk control unit 132 writes data read from the hard disk drive 120 into the cache memory 134. Furthermore, the disk control unit 132 transmits a data write completion notice or a data read completion notice to the channel control unit 131. In some cases, the disk control unit 132 has a function of controlling the hard disk drives 120 with RAID levels (such as 0, 1 or 5) prescribed in the so-called RAID (Redundant Array of Inexpensive Disks) scheme.

A storage area provided by each hard disk drive 120 is managed by taking a logical volume 121, which is a volume logically set on the storage area, as the unit. Writing/reading data into/from the hard disk drive 120 can be conducted by specifying an identifier provided for a logical volume.

The management terminal 136 is a computer for maintaining and managing the disk array apparatus 10. Alteration of software or a parameter executed in a channel control unit 131 or a disk control unit 132 is conducted under an order given by the management terminal 136. The management terminal 136 may be incorporated in the disk array apparatus 10 or may be separated from it.

The shared memory 133 can be accessed from the channel control units 131, the disk control units 132 and the management terminal 136. The shared memory 133 is used for transfer of a data input/output request command between a channel control unit 131 and a disk control unit 132. In addition, management information and so on of the disk array apparatus 10 are stored in the shared memory 133.

Figure 2:
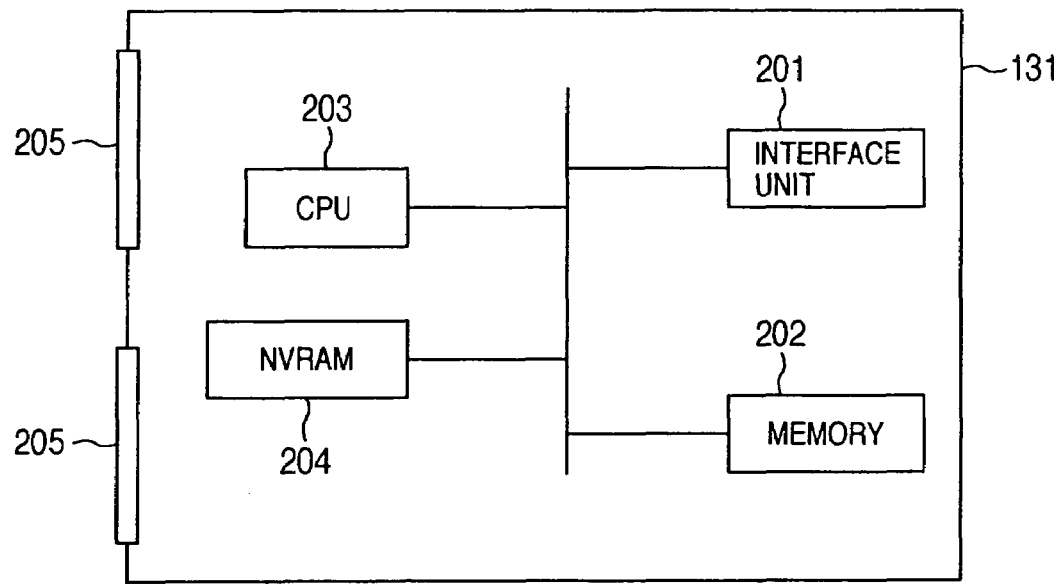
FIG. 2 is a block diagram showing a configuration of a channel control unit according to the embodiment.

FIG. 2 is a block diagram showing a configuration of each channel control unit 131. The channel control unit 131 includes an interface unit 201, a memory 202, a CPU 203, a NVRAM (Nonvolatile Random Access Memory) 204, and connectors 205. They are formed as one-body unit on one circuit board or a plurality of circuit boards.

The interface unit 201 has an interface for conducting communication with an information processing apparatus 20. The interface for conducting communication is, for example a connector corresponding to Fibre Channel or a connector corresponding to Ethernet (registered trademark).

The connectors 205 are connectors for connecting the channel control unit 131 to the disk array apparatus 10. By coupling the connectors 205 to connectors of the disk array apparatus 10 side, a circuit board having the channel control unit 131 formed thereon is electrically connected to the disk array apparatus 10. The channel control unit 131 is connected to the switching control unit 135 via the connectors 205. As a result, the channel control unit 131 can access the shared memory 133, the cache memory 134, the disk control units 132 and so on.

The CPU 203 takes the charge of generally controlling the channel control unit 131. The CPU 203 implements the function of the channel control unit 131 by executing various programs stored in the memory 202 and the NVRAM 204. The NVRAM 204 is a nonvolatile memory for storing various programs and setting data. Contents of the various programs and the setting data stored in the NVRAM 204 can be rewritten in obedience to an order given by the management terminal 136.

Figure 3:
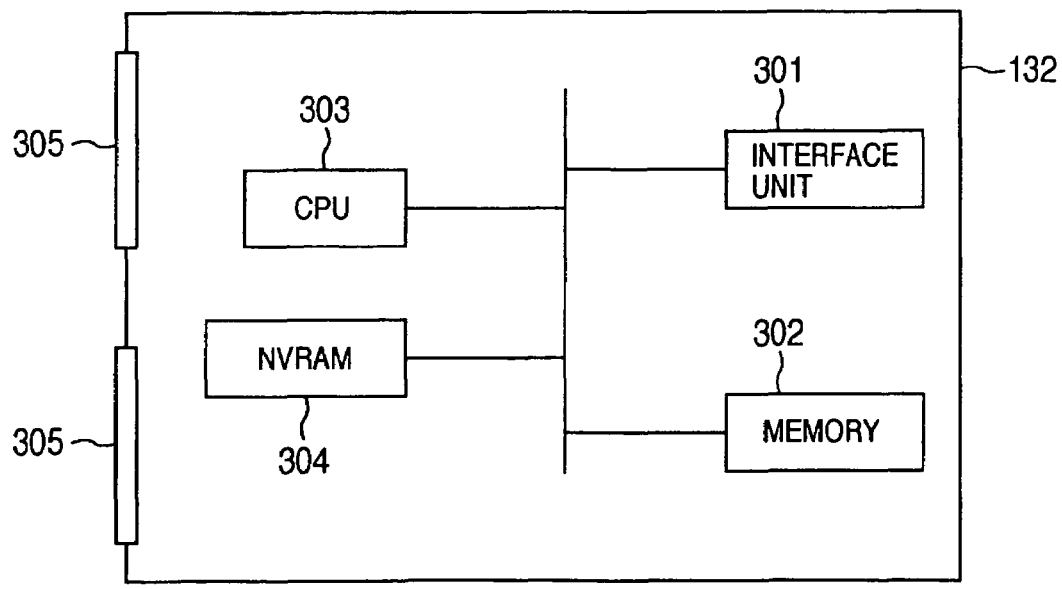
FIG. 3 is a block diagram showing a configuration of a disk control unit according to the embodiment.

FIG. 3 is a block diagram showing a configuration of each disk control unit 132. The disk control unit includes an interface unit 301, a memory 302, a CPU 303, a NVRAM 304 and connectors 305. They are formed on one circuit board or a plurality of circuit boards as a one-body unit.

The interface unit 301 has an interface for conducting communication with hard disk drives 120. The interface for conducting communication is, for example a connector conforming to the SCSI protocol or a connector conforming to the Fibre Channel protocol.

The connectors 305 are connectors for connecting the disk control unit 132 to the disk array apparatus 10. By coupling the connectors 305 to connectors of the disk array apparatus 10 side, a circuit board having the disk control unit 132 formed thereon is electrically connected to the disk array apparatus 10. The disk control unit 132 is connected to the switching control unit 135 via the connectors 305. As a result, the disk control unit 132 can access the shared memory 133, the cache memory 134, the channel control units 131 and so on.

The CPU 303 takes the charge of generally controlling the disk control unit 132. The CPU 303 implements the function of the disk control unit 132 by executing various programs stored in the memory 302 and the NVRAM 304. The NVRAM 304 is a nonvolatile memory for storing various programs and setting data. Contents of the various programs and the setting data stored in the NVRAM 304 can be rewritten in obedience to an order given by the management terminal 136.

Figure 4:
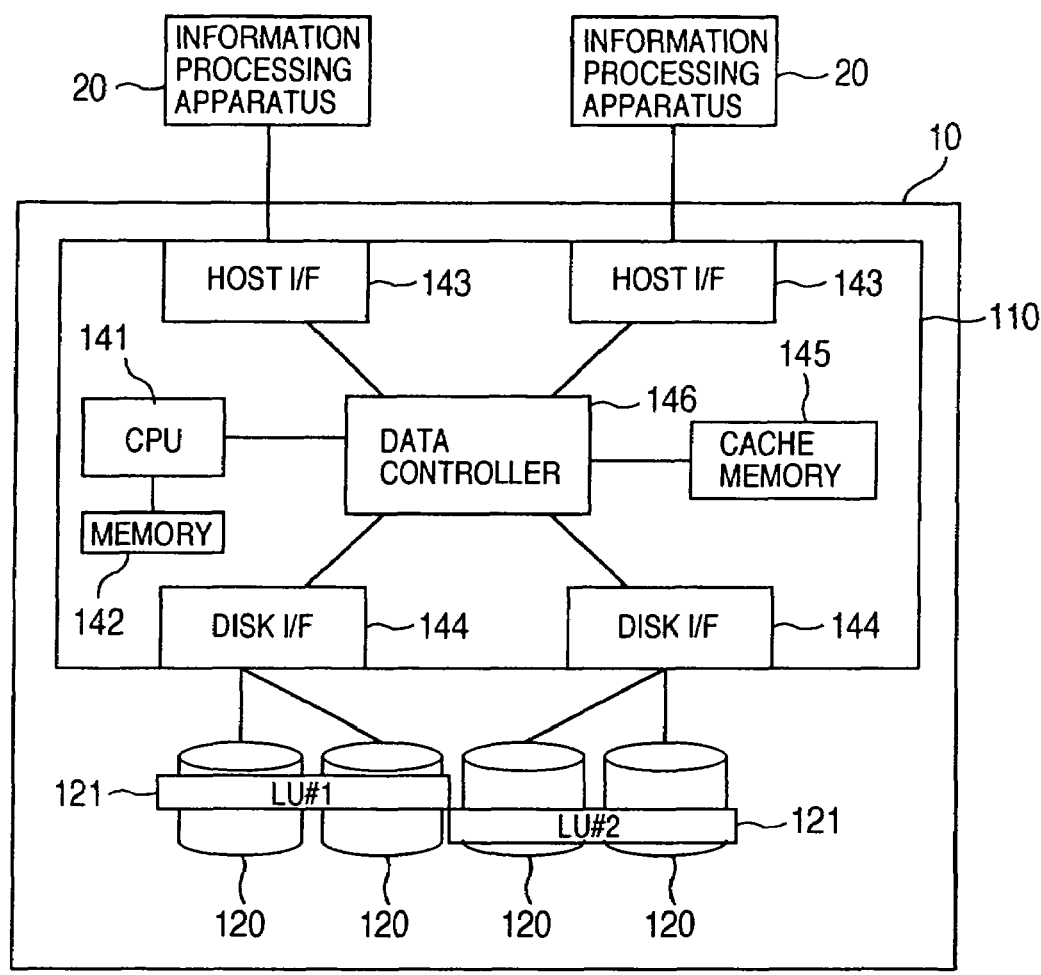
FIG. 4 is a block diagram showing a configuration of a second form of a disk array apparatus according to the embodiment.

A second form of a disk array apparatus in the present embodiment is shown in FIG. 4. The second form differs in configuration of the disk control device 110 from the first form shown in FIG. 1. The disk control device 110 includes a CPU 141, a memory 142, host interfaces 143, disk interfaces 144, a cache memory 145 and a data controller 146.

The CPU 141 takes the charge of generally controlling the disk array apparatus 10. The CPU 141 can implement various functions, such as management of the hard disk drives 120 and interpretation of a block access request, by executing a program stored in the memory 142.

The host interface 143 is an interface for conducting communication with an information processing apparatus 20. The host interface 143 has a function of accepting a block access request in accordance with Fibre Channel protocol.

The disk interface 144 is an interface for exchanging data with a hard disk drive 120. The disk interface 144 has a function of transmitting a data input/output request to the hard disk drive 120 in accordance with a protocol, which prescribes, for example, a command for controlling the hard disk drive 120. The disk interface 144 can transmit a data write command or a data read command to the hard disk drive in accordance with a protocol for SCSI, Fibre Channel or the like.

The cache memory 145 is a memory for storing data exchanged between a host interface 143 and a disk interface 144.

The data controller 146 conducts data transfer between a host interface 143 and the cache memory 145 or between the cache memory 145 and a disk interface 144 under the control of the CPU 141. The data controller 146 may be, for example, a circuit forming a logic circuit in an IC intended for specific use.

If an information processing apparatus 20 transmits a data write request for a hard disk drive 120 to the disk array apparatus 10, then in the disk array apparatus 10 a host interface 143 accepts a write request, and the data controller 146 transfers write data annexed to the write request to the cache memory 145. If the write data is transferred to the cache memory 145, then the data controller 146 reads out the write data from the cache memory 145 into a disk interface 144, and the disk interface 144 transmits a write ordering command to the hard disk drive 120.

By the way, the cache memory 145 may be made nonvolatile. In this case, when data received from the information processing apparatus 20 by the host interface 143 has been written into the cache memory 145, the CPU 141 may transmit a write completion notice to the information processing apparatus 20.

Heretofore, the configuration of the disk array apparatus 10 has been described. Besides the configuration heretofore described, the disk array apparatus 10 may be an apparatus functioning as a NAS (Network Attached Storage) configured so as to accept a data input/output request using file name specification from an information processing apparatus 20 in accordance with a protocol such as the NAS (Network File System).

==Operation Form of Database==

The operation form of the database constructed in the disk array apparatus 10 in the present embodiment will now be described.

Figure 5:
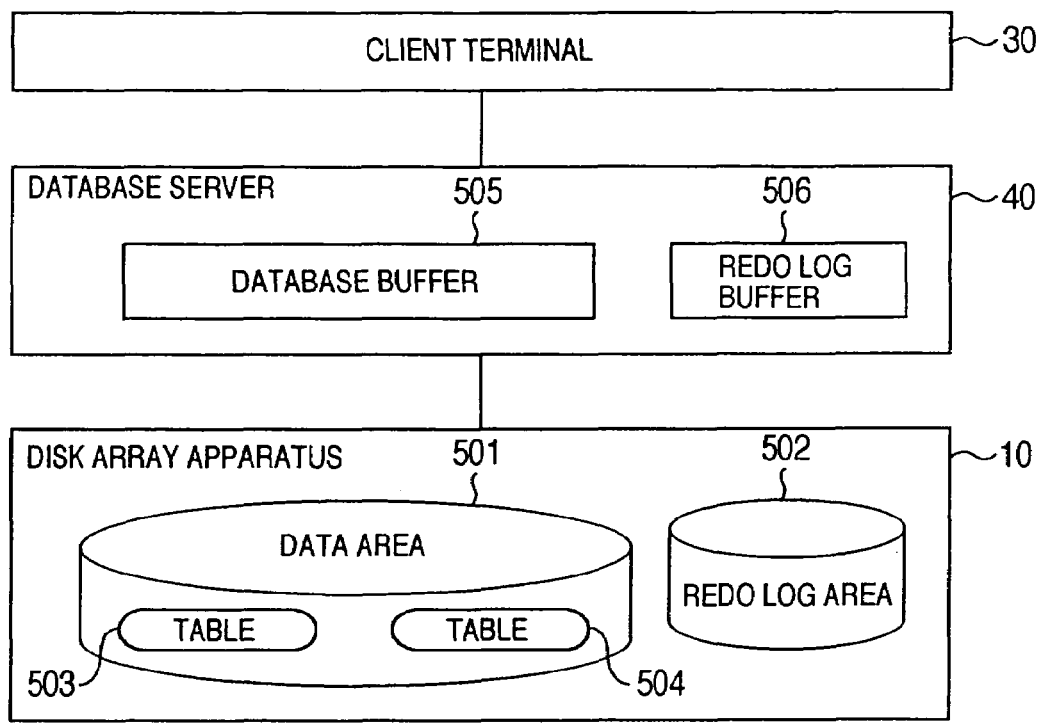
FIG. 5 is a diagram showing a database system including a client terminal, a database server and a disk array apparatus according to the embodiment.

FIG. 5 is a diagram showing a database system including a client terminal 30, a database server 40 and a disk array apparatus 10. The database server 40 corresponds to an information processing apparatus 20 shown in FIGS. 1 and 4.

Figure 6:
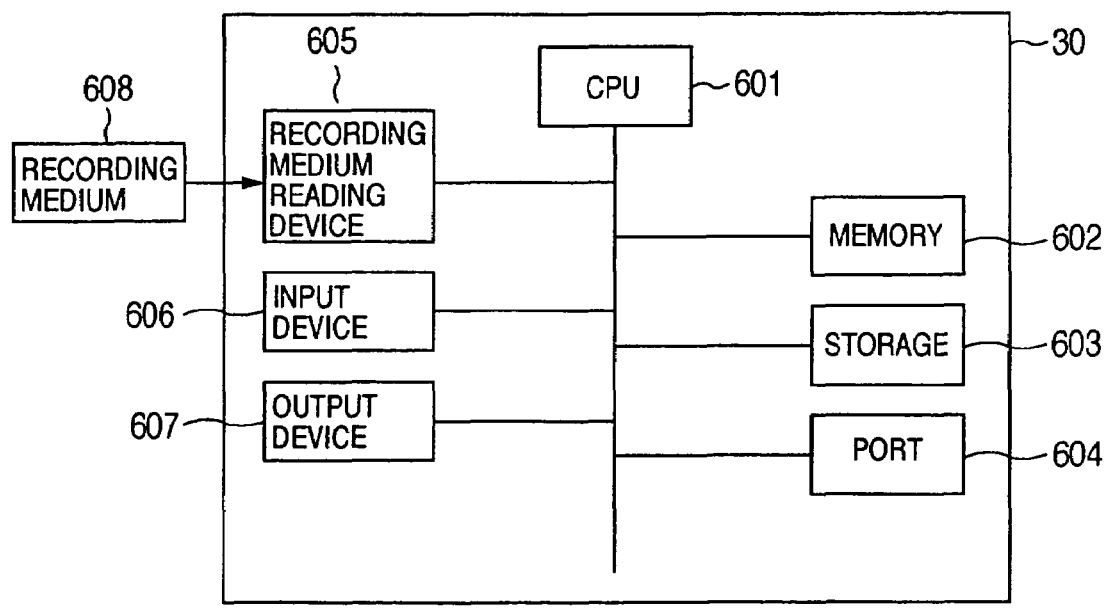
FIG. 6 is a block diagram showing a configuration of a client terminal according to the embodiment.

FIG. 6 is a block diagram showing a configuration of the client terminal 30. The client terminal 30 includes a CPU 601, a memory 602, a storage 603, a port 604, a recording medium reading device 605, an input device 606, and an output device 607.

The CPU 601 takes the charge of generally controlling the client terminal 30. The CPU 601 implements various functions by executing a program stored in the memory 602 or the storage 603. The storage 603 is a storage such as a hard disk drive. The recording medium reading device 605 is a device for reading a program or data recorded on a recording medium 608. The program or data thus read is stored in the memory 602 or the storage 603. As the recording medium 608, a flexible disk, a CD-ROM, a semiconductor memory, or the like can be used. The recording medium reading device 605 may be incorporated in the client terminal 30, or may be provided externally to the client terminal 30. The input device 606 is used by the operator or the like to input data to the client apparatus 30. As the input device 606, for example, a keyboard, a mouse or the like is used. The output device 607 is a device for outputting information to the outside. As the output device 607, for example, a display device, a printer or the like is used. The port 604 is a device for conducting communication with the database server 40.

Figure 7:
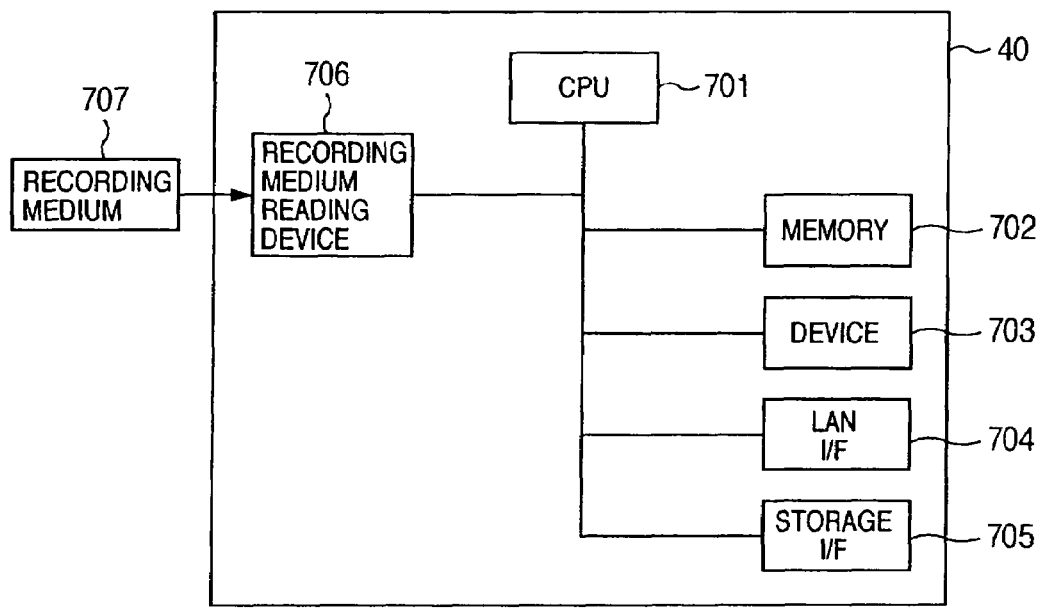
FIG. 7 is a block diagram showing a configuration of a database server according to the embodiment.

FIG. 7 is a block diagram showing a configuration of the database server 40. The database server 40 includes a CPU 701, a memory 702, a storage 703, a LAN interface 704, a storage interface 705 and a recording medium reading device 706.

The CPU 701 takes the charge of generally controlling the database server 40. The CPU 701 implements various functions by executing a program stored in the memory 702 or the storage device 703. The storage device 703 is a storage such as a hard disk drive. The recording medium reading device 706 is a device for reading a program or data recorded on a recording medium 707. The program or data thus read is stored in the memory 702 or the storage device 703. As the recording medium 707, a flexible disk, a CD-ROM, a semiconductor memory, or the like can be used. The recording medium reading device 706 may be incorporated in the database server 40, or may be provided externally to the database server 40.

The LAN interface 704 is an interface for conducting communication with the client terminal 30 via communication means such as a LAN. The storage interface 705 is an interface for conducting communication with the disk array apparatus 10 via communication means such as a SAN or a LAN.

As shown in FIG. 5, a data area 501 and a REDO log area 502 are provided in the disk array apparatus 10. The data area 501 and the REDO log area 502 are storage areas formed by one or more hard disk drives 120. The client terminal 30 transmits an update request for tables 503 and 504 stored in the data area 501 to the database server 40. A database buffer 505 and a REDO log buffer 506 are provided in the database server 40. The database buffer 505 and the REDO log buffer 506 are stored in the storage device 703. Data stored in the database buffer 505 is used as cache data for data stored in the data area 501. As a result, the database server 40 can respond to a table update request issued by the client terminal 30 without accessing the disk array apparatus 10, and the response time to the client terminal 30 can be shortened. In the same way, data stored in the REDO log buffer 506 is used as cache data for data stored in the REDO log area 502.

In database update processing, it is demanded to ensure update of a plurality of tables. For example, in the case of transfer between bank accounts, it is necessary to decrease the balance at the bank stored in a table for managing the account of transfer source and increase the balance at the bank stored in a table for managing the account of transfer destination. In other words, if the update of the table of the transfer source and the update of the table of the transfer destination are not completed, it is meant that the update processing has not been conducted correctly. The database server 40 has a function of thus ensuring the update of a plurality of tables. The client terminal 30 executes the update processing of a plurality of tables, and subsequently transmits a commit request for requesting the insurance of the update processing of the tables to the database server 40. If any fault has occurred in the middle of the update processing of the tables, the database server 40 can restore the tables to their states obtained before the update.

Figure 8:
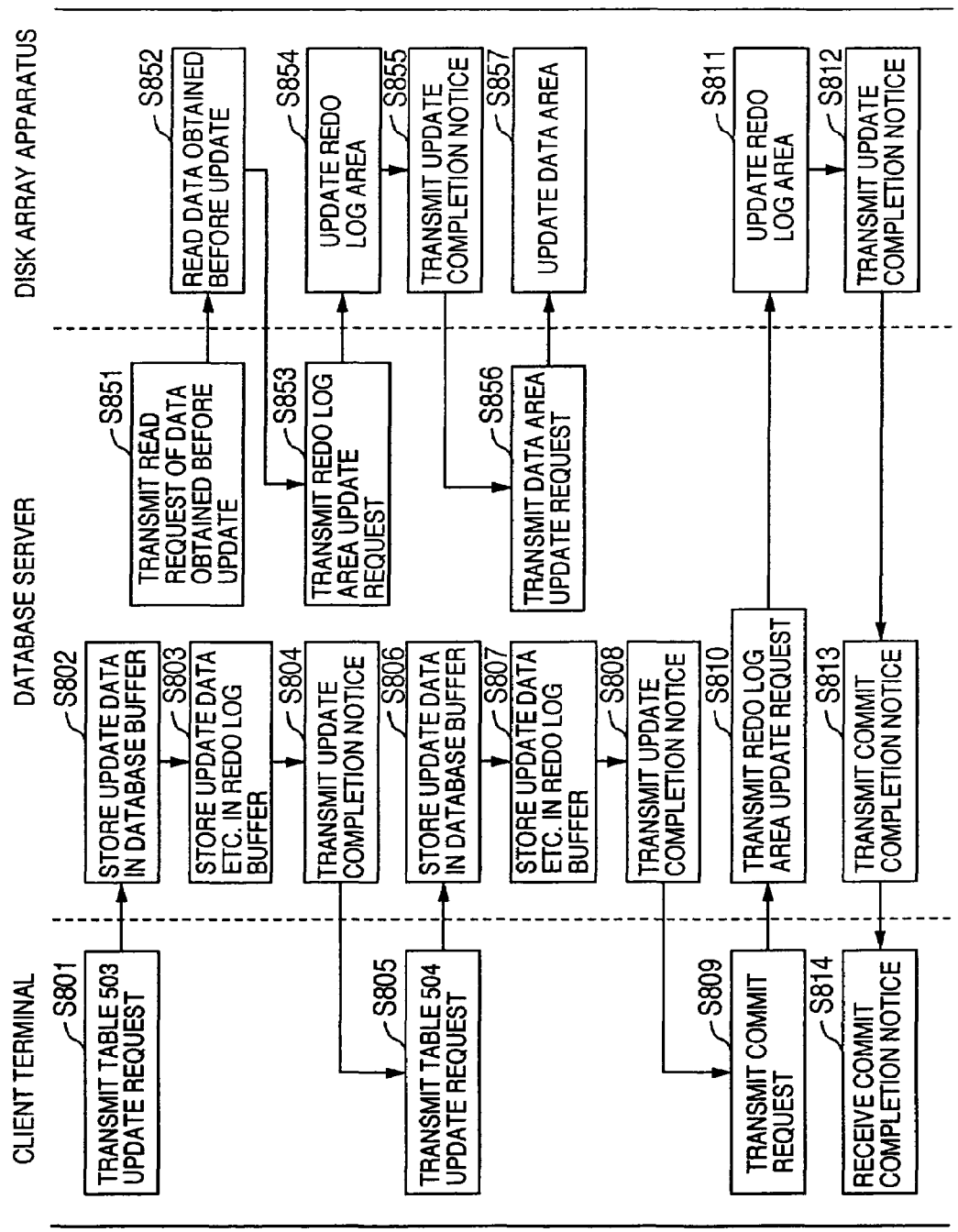
FIG. 8 is a flow chart showing table update processing in a database system according to the embodiment.

FIG. 8 is a flow chart showing processing of updating the tables 503 and 504 stored in the data area 501. The client terminal 30 transmits an update request for the table 503 to the database server 40 (S801). The update request contains an update location and update data in the table 503. Upon receiving the update request, the database server 40 stores the update data in the database buffer 505 on the basis of the update location information (S802). And the database server 40 stores the update location information and the update data in the REDO log buffer 506 (S803), and transmits an update completion notice to the client terminal 30 (S804). Subsequently, the client terminal 30 transmits an update request for the table 504 to the database server 40 (S805). The database server 40 updates the database buffer 505 and the REDO log buffer 506 in the same way (S806 and S807), and transmits an update completion notice to the client terminal 30 (S808). Upon receiving the update completion notice for the table 504, the client terminal 30 transmits a commit request for the update processing to the database server 40 (S809)

Upon receiving the commit request, the database server 40 transmits an update request to the disk array apparatus 10 in order to request writing the update location information and the update data in the update of the tables 503 and 504 stored in the REDO log buffer 506 into the REDO log area 502 (S810). The disk array apparatus 10 stores the update location information and the update data in the REDO log area 502 (S811), and transmits an update completion notice to the database server 40 (S812). Upon receiving an update completion notice for the REDO log area 502 from the disk array apparatus 10, the database server 40 transmits a commit completion notice to the client terminal 30 (S813). The client terminal 30 receives a commit completion notice from the database server 40 (S814), and recognizes that the update of the tables 503 and 504 has been ensured.

Asynchronously to the series of processing (S801 to S814) conducted between the database server 40 and the client terminal 30, the update data stored in the database buffer 505 is stored in the data area 501 in the disk array apparatus 501. First, the database server 40 transmits a request to the disk array apparatus 10 in order to request reading out the data obtained before the update from the data area 501 (S851). The disk array apparatus 10 reads out the data obtained before the update from the data area 501, and transmits the data obtained before the update to the database server 40 (S852). The database server 40 transmits a request to the disk array apparatus 10 in order to request writing the data and the update location information obtained before the update into the REDO log area 502 (S853). The disk array apparatus 10 stores the data and the update location information obtained before the update in the REDO log area 502 (S854), and transmits an update completion notice to the database server 40 (S855). Upon receiving the update completion notice for the REDO log area 502, the database server 40 transmits a request to the disk array apparatus 10 in order to request writing the update data stored in the database buffer 505 into the data area 501 (S856). And the disk array apparatus 10 stores the update data in the data area 501 (S857).

In this way, the database server 40 conducts time-consuming storage of the update data into the data area 501 at timing different from that of the storage of the update data into the database buffer 505. Thereby, the database server 40 shortens the response time for the update request issued by the client terminal 30.

Furthermore, if a fault occurs in the database server 40, it is possible to restore the data to contents reflecting the commit request issued by the client terminal 30, by confirming data (hereafter referred to as "REDO log") stored in the REDO log area 502. In other words, if update data consequent upon the commit request stored by the processing in S811 is not present in the REDO log, and data obtained before the update and stored by the processing in S854 is present in the REDO log, then the data obtained before the update is written into the data area 501. This is referred to as rollback processing. If update data consequent upon the commit request stored by the processing in S811 is present in the REDO log, and data obtained before the update and stored by the processing in S854 is not present in the REDO log, then the data obtained before the update is written into the data area 501. This is referred to as roll forward processing.

The processing of thus restoring the data in the data area 501 to the contents reflecting the commit request issued by the client terminal 30 is called database recovery processing. The recovery processing is not limited to the above-described procedure. For example, the recovery processing may be implemented by rolling back all data obtained before the update and rolling forward all update data consequent upon the commit request.

A typical restoration procedure of the data area 501 in the case where faults occur in a plurality of hard disk drives 120 and the data in the data area 501 cannot be restored by using the RAID redundancy or the like (hereafter referred to as "fault in data area") will now be described with reference to FIG. 9.

Figure 9:
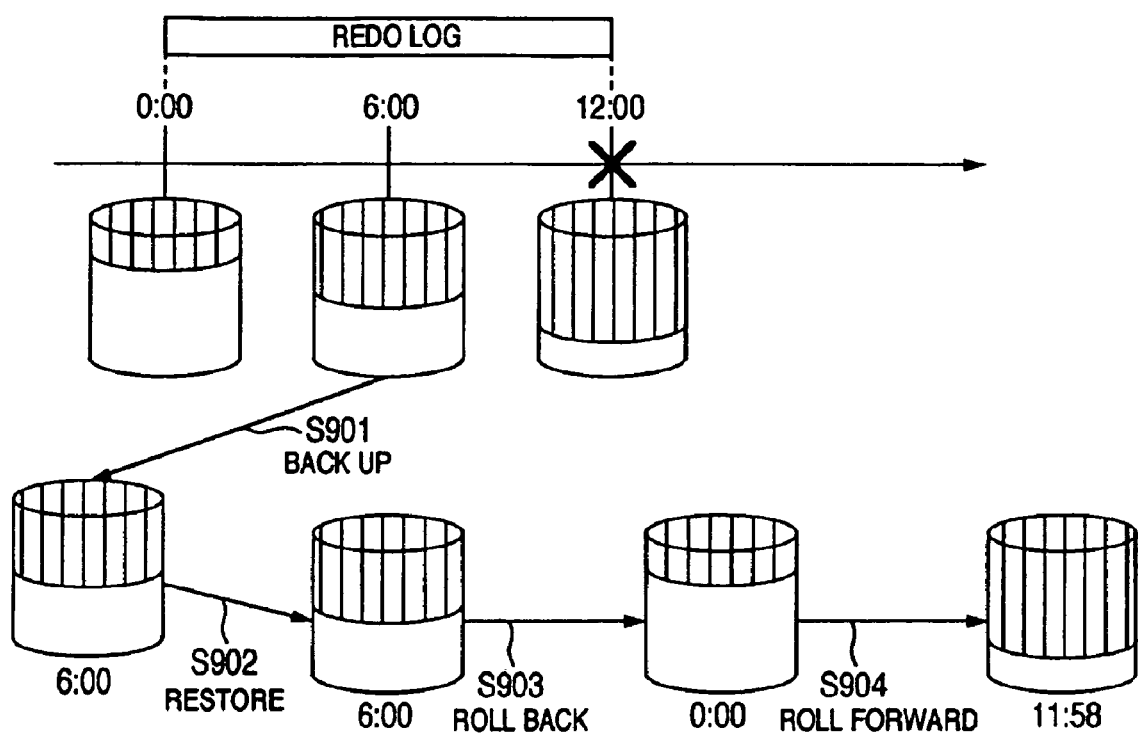
FIG. 9 is a diagram showing a typical procedure for restoring data by using a REDO log.

FIG. 9 shows the case where the REDO log recording is started at zero o'clock and a fault occurs in the data area 501 at twelve o'clock. The state of the data area 501 at six o'clock is backed up in a hard disk drive 120 different from a hard disk drive 120 forming the data area 501 or in a storage medium such as magnetic tape (S901). A general procedure for backing up the data in the data area 501 at a certain point in time (hereafter referred to as "static data") will be described later.

If a fault in the data area 501 has occurred at twelve o'clock, then one or more hard disk drives 120 in which the fault has occurred are replaced, and the data at six o'clock backed up is restored in the data area 501 (S902). And in accordance with the above-described recovery processing, all data obtained before the update and after zero o'clock are rolled back (S903), and update data consequent upon the commit request between zero o'clock and occurrence of the fault are rolled forward (S904). As a result, the data area 501 can be restored to the state obtained immediately before the fault.

Also in the case where the data area 501 has become an illegal state because of a fault caused by a user's operation mistake or a software fault, the data area 501 can be restored by using the static data and the REDO log. "A fault caused by a user's operation mistake" is, for example, disappearance of the data area 501 caused by formatting the data area 501 on a file system. "A software fault" is, for example, a mismatch caused in data stored in the data area 501 by a trouble in an application program or the like. If such a fault has occurred, the fault time is discriminated to some degree and the roll forward processing using the REDO log is conducted until before the fault time. As a result, the data area 501 in the state obtained before the fault can be restored.

If a fault has occurred in the data area 501, the data area 501 can be restored by using the static data and the REDO log. Furthermore, by retaining the static data in the disk array apparatus 10, it is also possible to restore the data area 501 quickly without restoring data from magnetic tape or the like.

==Data Backup Scheme==

Figure 10:
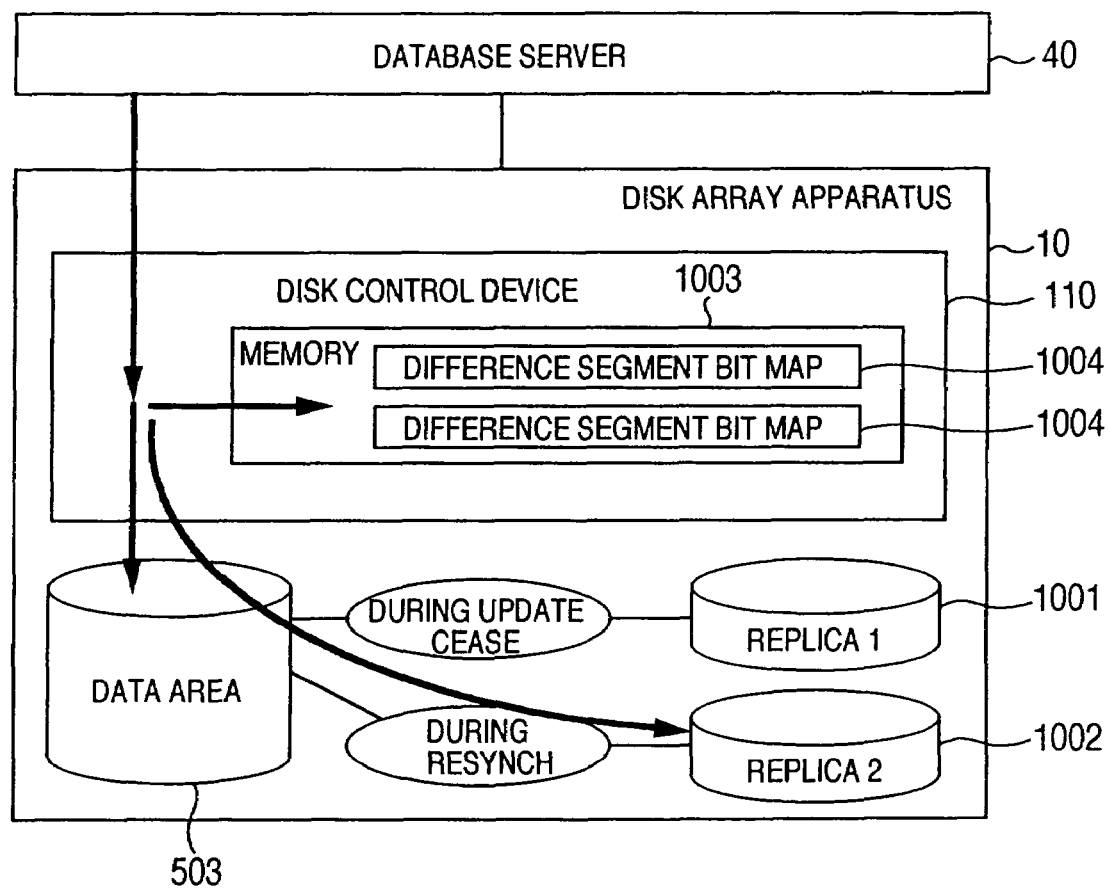
FIG. 10 is a diagram showing a scheme for backing up data by using a replica volume.
Figure 11:
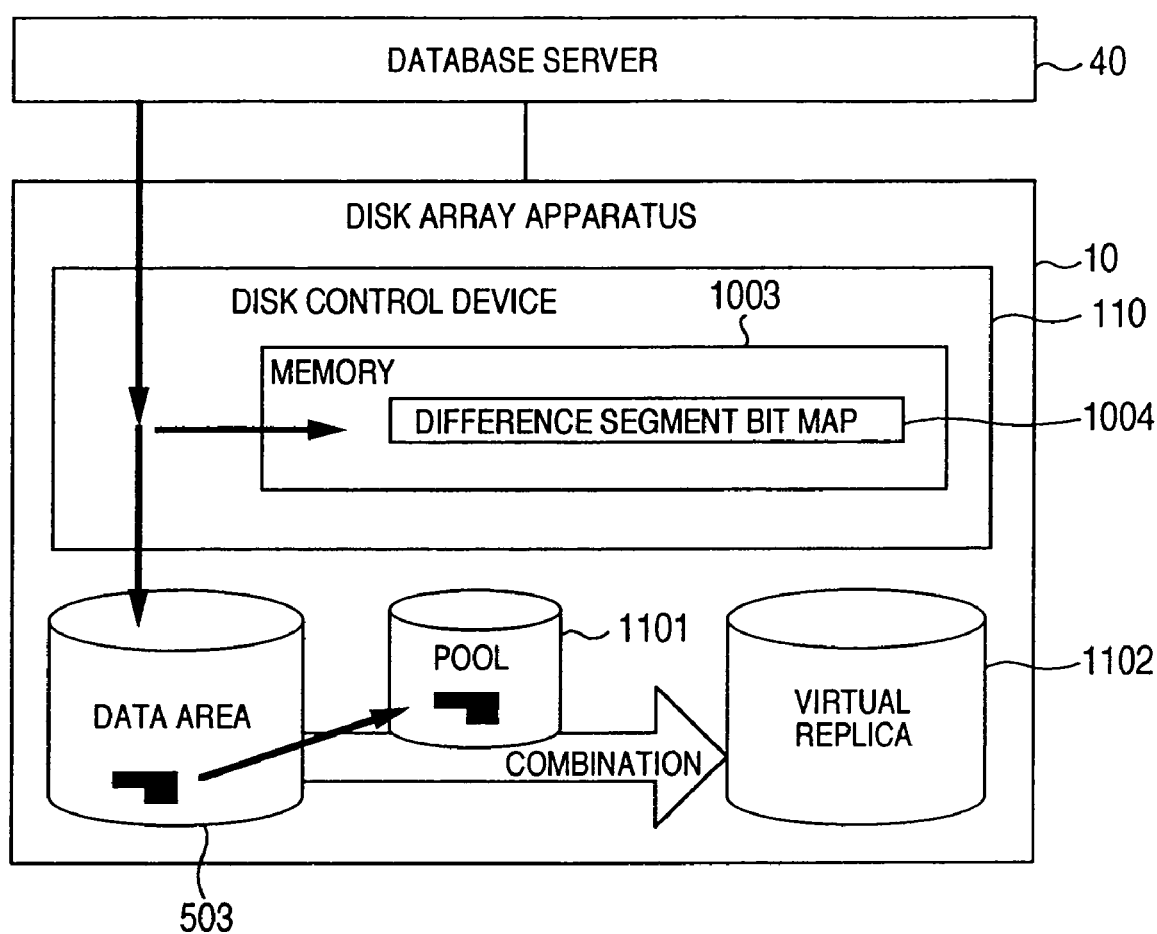
FIG. 11 is a diagram showing a scheme for backing up data by using a snapshot.

The data backup scheme will now be described. FIG. 10 is a diagram showing a replica scheme, and FIG. 11 is a diagram showing a snapshot scheme.

First, the replica scheme will now be described with reference to FIG. 10. In the replica scheme, a replica volume 1001 is provided as a storage area different from the data area 501. The replica volume 1001 includes one or more hard disk drives 120. Upon receiving an update request for the data area 501 from the database server 40, the disk control device 110 writes update data in both the data area 501 and the replica volume 1001. The state in which the update data has been written into both the data area 501 and the replica volume 1001 is referred to as synchronous state. The disk control device 110 receives a split ordering instruction for stopping writing the update data from the database server 40 or the like into the replica volume 1001. Upon receiving the split ordering instruction, the disk control device 110 stops writing the update data into the replica volume 1001. In other words, the replica volume 1001 is static data of the data area 501 at a point in time when the split ordering instruction has been received.

The disk control device 110 stores location information of the update data written into the data area 501 while the update of the replica volume 1001 is stopped, in a difference segment bit map 1004 in a memory 1003. The memory 1003 is the shared memory 133 or the cache memory 134 shown in FIG. 1, the cache memory 145 shown in FIG. 4, or the like. Upon receiving a resynchronization ordering instruction for bringing the replica volume 1001 into the synchronous state from the database server 40 or the like, the disk control device 110 reads out data indicated by location information stored in the difference segment bit map 1004 from the data area 501, and writes the data thus read out into the replica volume 1001. Processing consequent upon the resynchronization ordering instruction is referred to as resynchronization processing.

If the data written into the data area 501 while the update is stopped is large in quantity, the resynchronization processing requires a considerably long time. In the resynchronization processing, the data in the replica volume 1001 is updated by taking a segment as the unit irrespective of the data update order in the data area 501. In other words, during the execution of the resynchronization processing, the replica volume 1001 is not brought into the state of the data area 501 at a certain point in time. If a fault occurs in the data area 501 during the execution of the resynchronization processing, therefore, the replica volume 1001 cannot be used to restore the data area 501.

In some cases, therefore, another replica volume 1002 is provided in the disk array apparatus 10. By conducting the update stopping and the resynchronization processing alternately in the two replica volumes 1001 and 1002 in this case, static data of the data area 501 can be ensured in the disk array apparatus without fail.

The snapshot scheme will now be described with reference to FIG. 11. In the snapshot scheme, a pool 1101 is provided as a storage area different from the data area 501. The pool 1001 includes one or more hard disk drives 120. Furthermore, a virtual replica volume 1102, which is a virtual replica volume, is provided. The disk control device 110 receives a creation order of the virtual replica volume 1102 from the database server 40 or the like. Upon receiving an update request for the data area 501 from the database server 40, the disk control device 110 reads out the data obtained before the update and stored in the scheduled update location in the data area 501, and writes the data into the pool 1101. And the disk control device 110 writes the update data into the data area 501, and stores the location information of the update data in the difference segment bit map 1004 in the memory 1003. Upon receiving a read request for the virtual replica volume 1102, the disk control device 110 refers to the difference segment bit map 1004. If the location information of the read data is stored, the disk control device 110 reads out data from the pool 1101. Otherwise, the disk control device 110 reads out data from the data area 501. In other words, the virtual replica volume 1102 is static data for the data area 501 at a point in time when the creation order of the virtual replica volume 1102 has been received.

The replica scheme and the snapshot scheme heretofore described have the following drawbacks. In the replica scheme, it is necessary to read out data stored in the data area 501 at the time of resynchronization processing. Therefore, competition with the update processing of the data area 501 consequent upon the update request for the data area received from the database server 40 occurs, and the performance of access from the database server 40 to the data area 501 is degraded. Furthermore, if the two replica volumes 1001 and 1002 are provided, a storage capacity that is three times that of the data area 501 is needed and the introduction cost of the disk array apparatus 10 becomes high.

In the snapshot scheme, it is necessary to read out data stored in the data area 501 when reading out the virtual replica volume 1102, which is the static data. In the same way as the replica scheme, therefore, competition with the update processing for the data area 501 consequent upon the update request for the data area 501 received from the database server 40 occurs, and consequently the performance of the access from the database server 40 to the data area 501 is degraded. Furthermore, if a fault occurs in the data area 501, static data for the data area 501 is not present in the disk array apparatus 10. Therefore, the data area 501 cannot be restored quickly.

Figure 12:
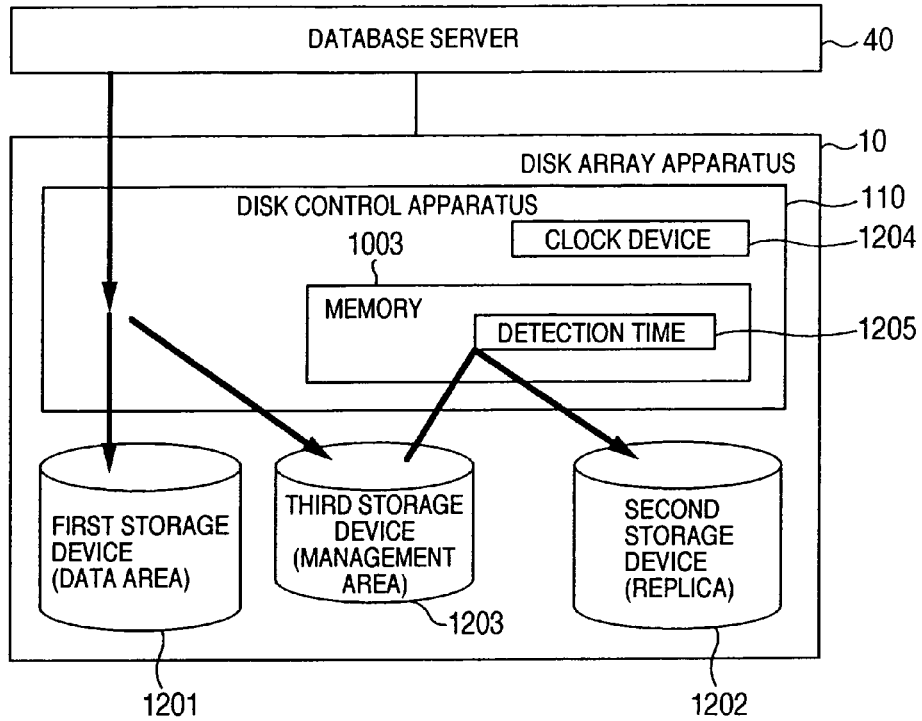
FIG. 12 is a diagram showing a backup scheme according to the embodiment.

A data backup scheme according to the present embodiment improved as compared with the replica scheme and the snapshot scheme will now be described with reference to FIG. 12.

The disk array apparatus 10 includes a first storage device 1201 storing the data area 501, a second storage device 1202, and a third storage device 1203. Each of the first to third storage devices 1201 to 1203 includes one or more hard disk drives 120. In each of the first storage device 1201 and the second storage device 1202, one or more logical volumes 121 are formed. The hard disk drive 120 forming the first storage device 1201 is physically different from the hard disk drive 120 forming the second storage device 1202 and the third storage device 1203. By the way, the REDO log is stored in a hard disk drive 120 different from a hard disk drive 120 forming the first storage device 1201 included in the disk array apparatus 10. The REDO log may be stored in a storage device external to the disk array apparatus 10. The disk control device 110 includes a clock device 1204. The clock device 1204 provides date and hour in response to an external request. The clock device 1204 is a timing circuit for counting time by using a clock signal. In a memory 1003, detection time 1205, which is predetermined time, is stored. The detection time 1205 is registered from the management terminal 136, an information processing apparatus 20, or the like.

An outline of data update processing in the present scheme will be described; The disk control device 110 receives an update request for a logical volume 121 in the first storage device 1201 from the database server 40. Upon receiving the update request, the disk control device 110 writes update data into the logical volume in the first storage device 1201. And the disk control device 110 writes journal data, which includes the update data written into the first storage device, information representing a location where the update data is written, and update time, into the third storage device. The disk control device 110 refers to the journal data written into the third storage device at predetermined intervals. With respect to journal data for which the difference between the update time and the current time exceeds the detection 1205, the disk control device 110 writes the update data into the logical volume 121 in the second storage device in the order of the update time. The logical volume 121 in the second storage device 1202 assumes the state assumed by the logical volume 121 in the first storage device 1201 earlier by the detection time 1205. In other words, if a fault has occurred in the first storage device 1201, the first storage device 1201 can be restored by using the second storage device 1202 and the third storage device 1203 or the REDO log.

Figure 13:
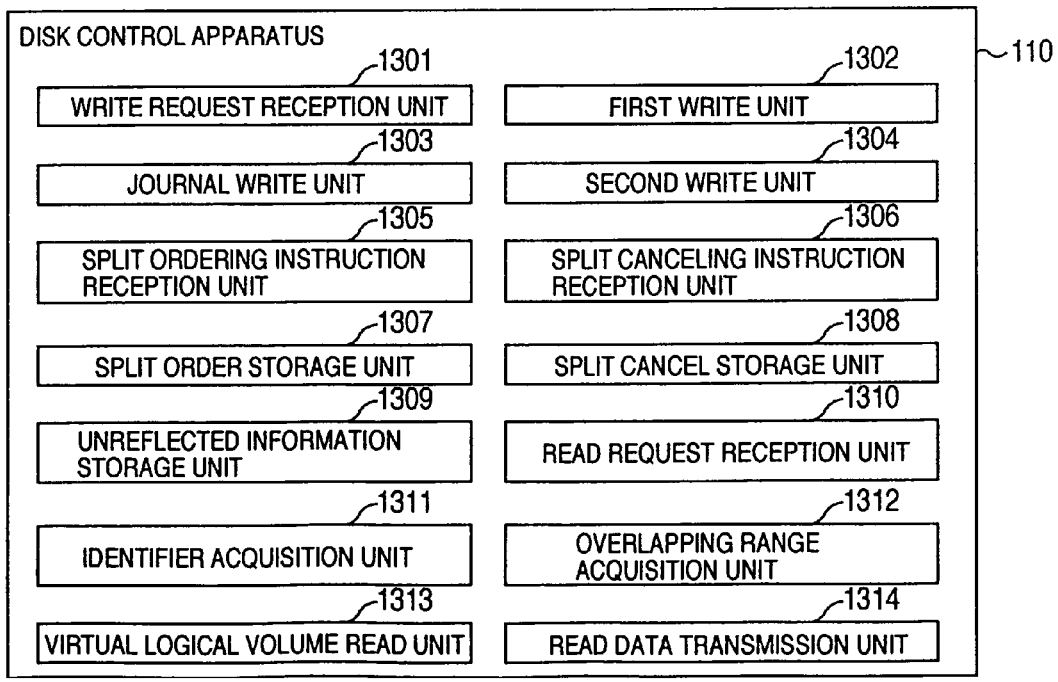
FIG. 13 is a block diagram showing a function for implementing a backup scheme according to the embodiment.

FIG. 13 is a block diagram showing a function of implementing the above-described data update processing in the disk control device 110 according to the present embodiment. The disk control device 110 includes a write request reception unit 1301, a first writing unit 1302, a journal writing unit 1303, a second writing unit 1304, a split ordering instruction reception unit 1305, a split canceling instruction reception unit 1306, a split order storage unit 1307, a split cancel storage unit 1308, an unreflected information storage unit 1309, a read request reception unit 1310, an identifier acquisition unit 1311, an overlap range acquisition unit 1312, a virtual logical volume readout unit 1313, and a read data transmission unit 1314. The units 1301 to 1314 are implemented by execution of programs stored in the memory 202, 302 or 142 or the NVRAM 204 or 304 by the CPU 203 or the CPU 303 in the disk array apparatus 10 shown in FIGS. 1 to 3, or the CPU 141 in the disk array apparatus 10 shown in FIG. 4.

==Pair and Group==

Figure 14:
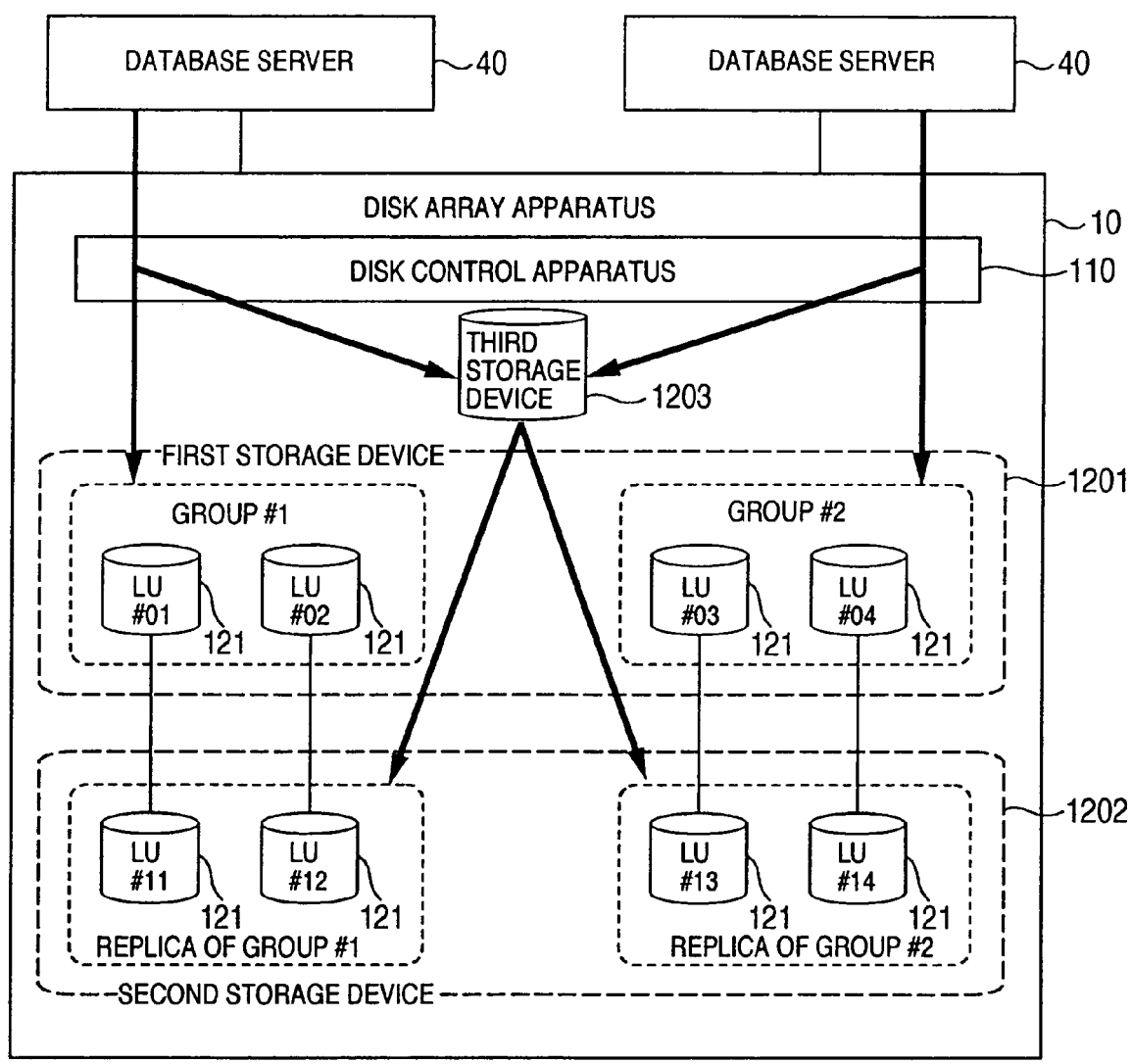
FIG. 14 is a diagram showing a relation between a logical volume in a first storage device and a logical volume in a second storage device according to the embodiment.

FIG. 14 is a diagram showing a relation between the logical volumes 121 in the first storage device 1201 and the logical volumes 121 in the second storage device 1202. The logical volumes 121 in the first storage device 1201 are associated with the logical volumes 121 in the second storage device 1202. In this association, the logical volumes 121 in the first storage device 1201 are referred to as primary logical volumes, and the logical volumes 121 in the second storage device 1202 are referred to as secondary logical volumes. This association is called pair. Identifiers in the primary logical volume and identifiers in the secondary logical volume are associated with each other and stored in a pair management table 1501 shown in FIG. 15. Furthermore, the logical volumes 121 in the first storage device 1201 form groups each including one or more logical volumes 121. Each group is formed for, for example, each database server or each database instance provided by the database server 40. In other words, it can be said that the database server 40 uses the logical volumes 121 in the first storage device 1201 by taking a group as the unit. Therefore, it becomes necessary to back up the logical volumes 121 in the first storage device 1201 by taking a group as the unit. Each group is provided with a group ID indicating the group. Association of identifiers of the logical volumes 121 with group IDs is stored in a group management table 1601 shown in FIG. 16. The pair management table 1501 and the group management table 1601 are stored in the memory 1003, and registration is conducted from the management terminal 136, the information processing apparatus 20, or the like.

==Journal Data==

Figure 17:
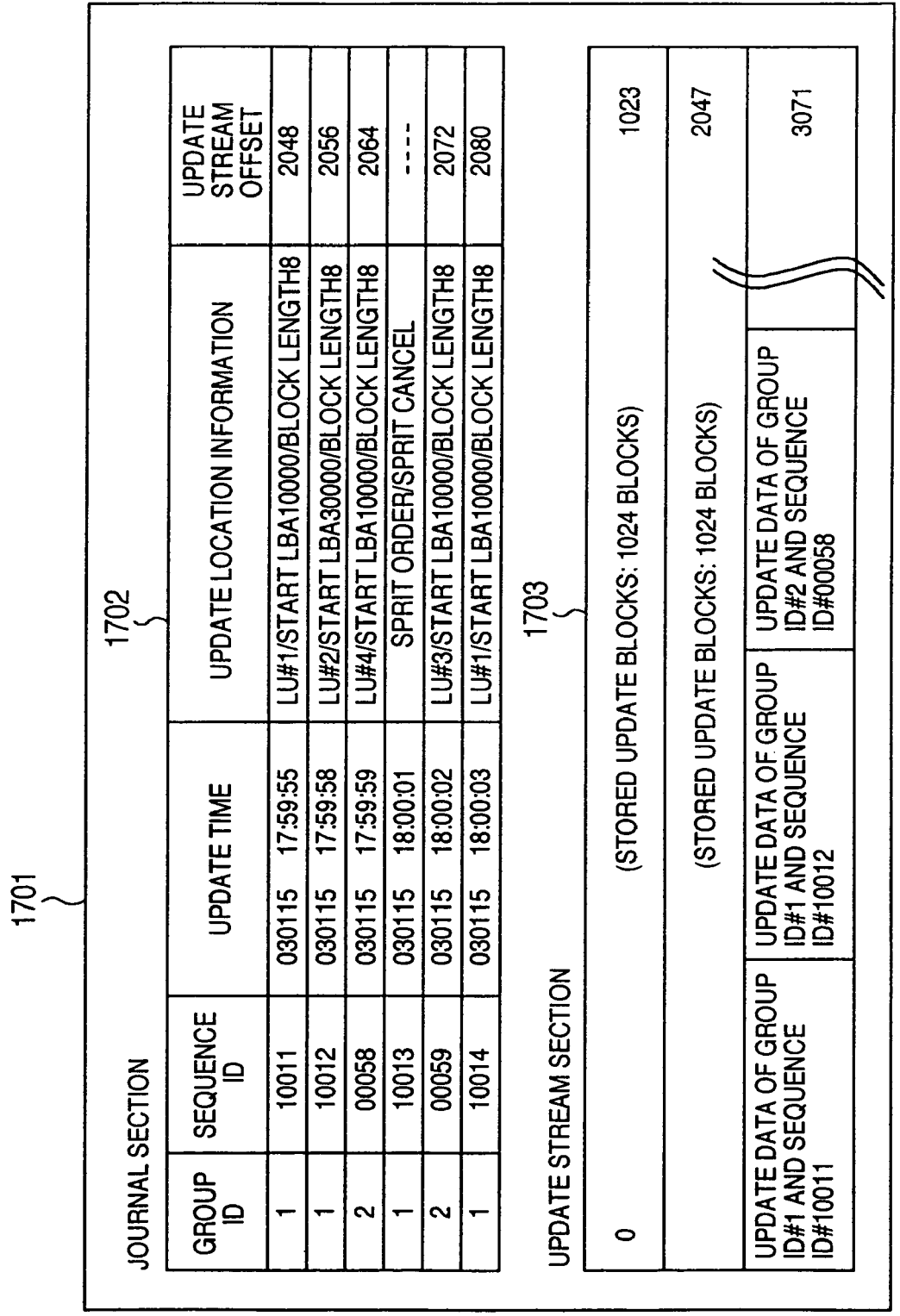
FIG. 17 is a diagram showing journal data according to the embodiment.

FIG. 17 is a diagram showing journal data written into the third storage device 1203. Journal data 1701 includes a journal section 1702 and an update stream section 1703.

The journal section 1702 includes a group ID, a sequence ID, update time, update location information, and update stream offset. Upon receiving a request for writing update data into a logical volume 121 in the first storage device 1201 from the database server 40, the disk control device 110 stores the journal data 1701 in the third storage device 1203. The group ID is a group ID of a group to which the logical volume 121 belongs. The sequence ID indicates an update sequence of update data in the first storage device 1201, and it is a sequential number managed from group to group. Update data stored in the journal data 1701 are written into the logical volume 121 in the second storage device 1202 in the order of the sequence ID from group to group. The update time is date and time acquired from the clock device 1204 when the disk control device 110 stores the journal data 1701. Therefore, the order of the sequence ID is the same as the order of the update time. In the update location information, the identifier of the logical volume 121 and information of location in which the update data is stored in the logical volume 121 are stored. By the way, the information of location in which data is stored is, for example, information indicated by a start address and a data length from the start address. Location information of the update data in the update stream section 1703 is stored in the update stream offset. In the update stream section 1703, update data is stored in the location indicated in the update stream offset.

If the disk control device 110 has received a split ordering instruction described later, data indicating that the split ordering instruction has been received is stored in the update location information. In the "group ID," a group ID specified in the split ordering instruction is stored. In the "sequence ID," a sequence ID of the group ID specified by the split ordering instruction is stored. In the "update time," date and time acquired from the timing mechanism 1201 are stored. The data thus written into the journal section 1701 in accordance with the split ordering instruction is referred to as split ordering data. If the disk control device 110 has received a split canceling instruction described later, data indicating that the split canceling instruction has been received is stored in the "update location information." The data thus written into the journal section 1701 consequent upon the split canceling instruction is referred to as split cancel data.

A storage area in the journal data 1701 indicating update data completed in reflection to the logical volume 121 in the second storage device 1202 is managed as an empty area, and reused as a storage area in the journal data 1701 indicating different update data.

==Split Operation==

Figure 18:
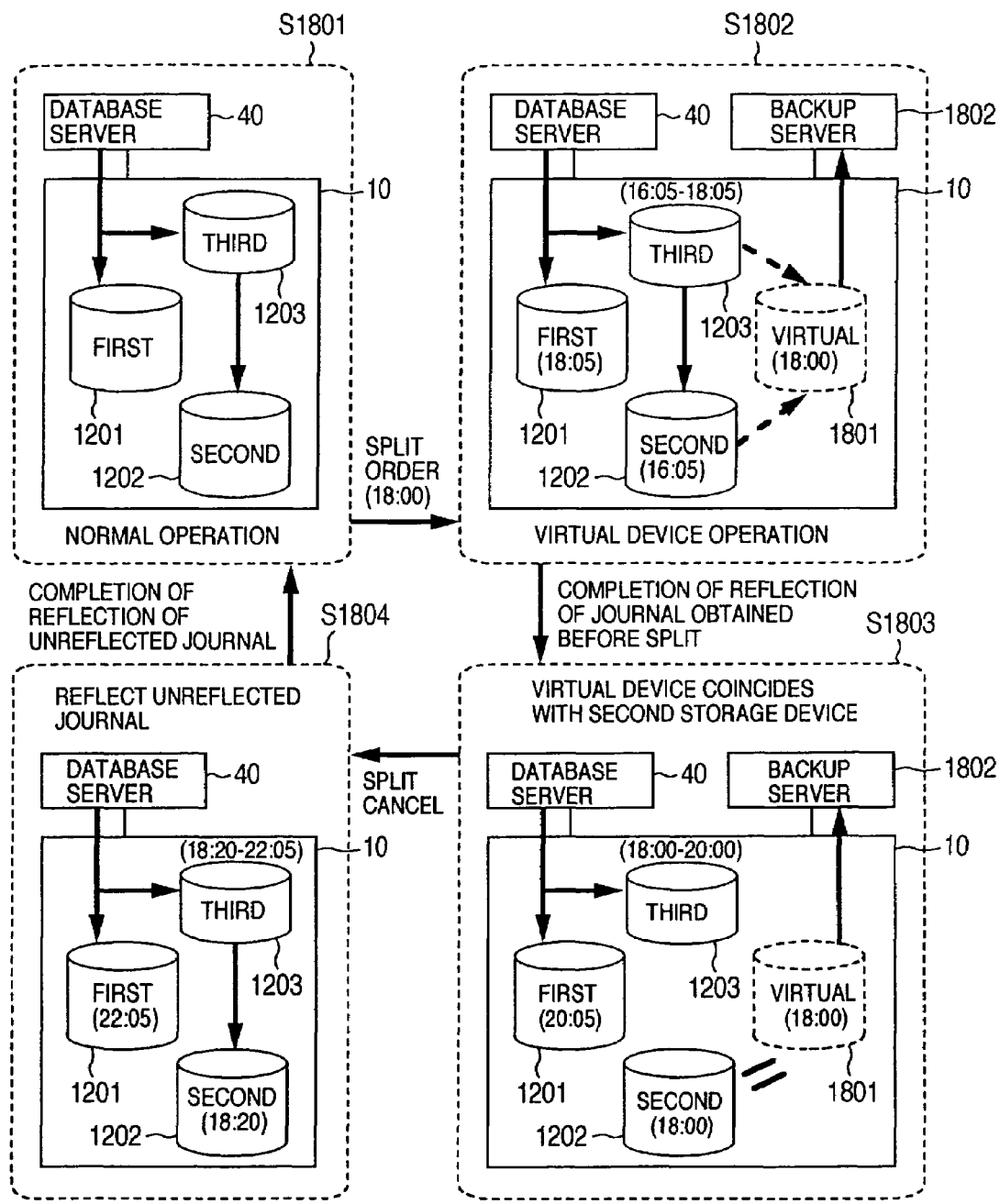
FIG. 18 is a diagram showing a state transition made in a disk array apparatus when a split ordering instruction has been received, according to the embodiment.

An outline of creation of static data and backup of data in the present embodiment will now be described. FIG. 18 is a diagram showing state transition of the disk array apparatus 10 in the case where the split ordering instruction for creating static data has been received.

First, in the normal operation state (S1801), update data for which the difference between the update time and the current time exceeds the detection time 1205 is extracted from the journal data 1701 in the third storage device 1203, and written into the second storage device 1202.

Upon receiving the split ordering instruction from the database server 40, a backup server 1803 or the like, the disk array apparatus 10 makes a transition to a state (S1802) for creating a virtual device 1801. The backup server 1803 is an apparatus corresponding to the information processing apparatus 10 shown in FIGS. 1 and 4. The backup server 1803 has a function of reading out data stored in the disk array apparatus 10 and creating its backup in an external storage medium.

S1802 in FIG. 18 shows a state in which five minutes has elapsed since the disk array apparatus 10 received the split ordering instruction at eighteen o'clock (split time). In the example shown in FIG. 18, the detection time is two hours. In the S1802, update data obtained until 16:05 which is two hours earlier than the current time is reflected in the second storage device 1202. In other words, update data obtained between 16:05 and 18:00 are not yet reflected in the second storage device 1202, and are stored in the third storage device 1203.

As static data for the first storage device at 18:00, therefore, the virtual device 1801 is provided. Virtual logical volumes are provided in the virtual device 1801. Association between identifiers of virtual logical volumes and identifiers of the logical volumes 121 in the second storage device 1202 is stored in a virtual logical volume management table 1901. The virtual logical volume management table 1901 is stored in the memory 1003, and registration is conducted from the management terminal 136 or the information processing apparatus 20.

The disk control device 110 extracts update location information of the journal data 1701 for which the update time is earlier than the split time, and stores the update location information in the memory 1003 as unreflected information. A storage scheme of the unreflected information is, for example, a bit map scheme in which a storage area in the second storage device 1202 is divided into a plurality of segments and it is indicated by taking a segment as the unit whether unreflected update data is present. Upon receiving a data read request for a virtual logical volume from a backup server 1802, the disk control device 110 reads data from the third storage device 1203 with respect to data stored in a location indicated by unreflected information. With respect to data stored in a location other than the location indicated by unreflected information, the disk control device 110 reads out the data from the second storage device. As a result, static data at eighteen o'clock for the first storage device 1201 can be provided for the backup server 1802.

Also while the virtual device 1801 is being provided, reflection of update data from the third storage device 1203 into the second storage device 1202 is conducted. In order to make the virtual device 1801 static data, therefore, the disk control device 110 does not reflect the update data for which the update time is later than the split time into the second storage device 1202. S1803 indicates this case. In the S1803, update data obtained until 18 o'clock which is the split time is reflected into the second storage device 1202. Therefore, the second storage device 1202 coincides with the virtual device 1801.

Upon receiving the split canceling instruction from the database server 40, the backup server 1801, or the like, the disk array apparatus 10 resumes reflection of the update data for which the difference between the update time and the current time exceeds the detection time 1205, stored in the third storage device 1203, into the second storage device 1202. S1804 indicates this state. If this reflection is completed, the disk array apparatus returns to the normal operation state (S1801).

Upon receiving the split ordering instruction, the disk control device 110 may reflect update data for which the update time is earlier than the split time into the second storage device 1202, without using the virtual device 1801 irrespective of whether the difference between the update time and the current time exceeds the detection time 1205. In this case, the backup server 1802 reads out data not from the virtual device 1801 but from the second storage device 1202, and conducts backup.

==Description of Operation==

Operation of the units 1301 to 1314 in the disk control device 110 for implementing the backup scheme in the present embodiment heretofore described will now be described.

==Writing into Third Storage Device==

Figures 19, 20:
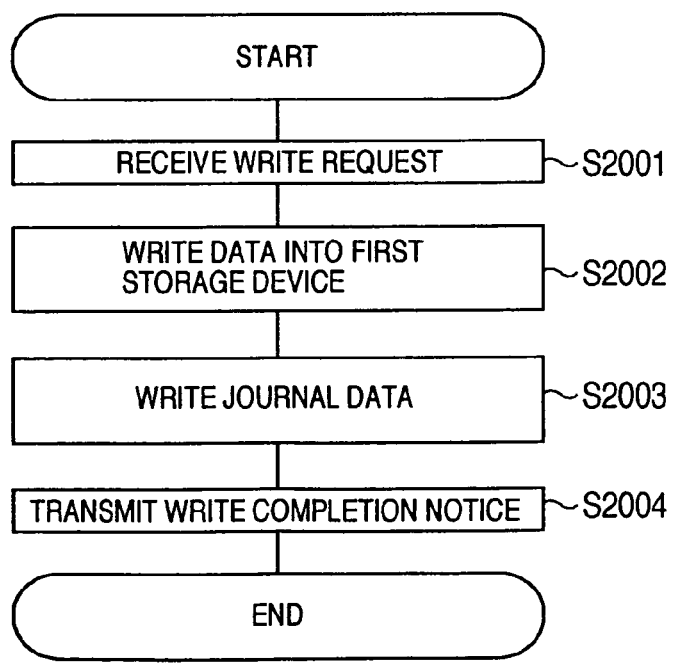
FIG. 19 is a diagram showing a virtual logical volume management table according to the embodiment.
FIG. 20 is a flow chart showing processing conducted when a disk control apparatus has received a write request for a logical volume in the first storage device, according to the embodiment.

FIG. 20 is a flow chart showing processing conducted when the disk control device 110 has received a data write request for a logical volume 121 in the first storage device 1201 from the database server 40.

The write request reception unit 1301 receives a data write request and write data for the logical volume 121 in the first storage device 1201 from the database server 40 (S2001). The first write unit 1302 writes the data into the logical volume 121 specified by the write request in the first storage device 1201 (S2002). The journal write unit 1303 writes the journal data 1701 for the data into the third storage device 1203 (S2003). And the journal write unit 1303 transmits a write completion notice of the data to the database server 40 (S2004).

Generation of the journal data is conducted as described below. The journal write unit 1303 acquires a group ID corresponding to the identifier of the logical volume from the group management table 1601, and sets the acquired group ID in the "group ID" in the journal data 1701. The journal write unit 1303 adds one to the sequence ID provided last time in the acquired group ID, and sets a result in the "sequence ID" in the journal data 1701. The journal write unit 1303 acquires the current date and hour from the clock device 1204, and sets the acquired current date and hour in the "update time" in the journal data 1701. The journal write unit 1303 sets the identifier of the logical volume and information of the location in which the data is written in the "update location information" in the journal data 1701. The journal write unit 1303 sets a location in the update stream unit 1703 in which the data is to be subsequently stored, in the "update stream offset" in the journal data 1701. And the journal write unit 1303 stores the data in the update stream unit 1703.

Before being written into the logical volume 121 in the third storage device 1203, the journal data 1701 is written into the memory 1003. If the memory 1003 has a redundant configuration and is nonvolatile, the journal write unit 1303 may transmit a write completion notice of the data to the database server 40 when the journal data 1701 has been written into the memory 1003.

==Split Order==

Figure 21:
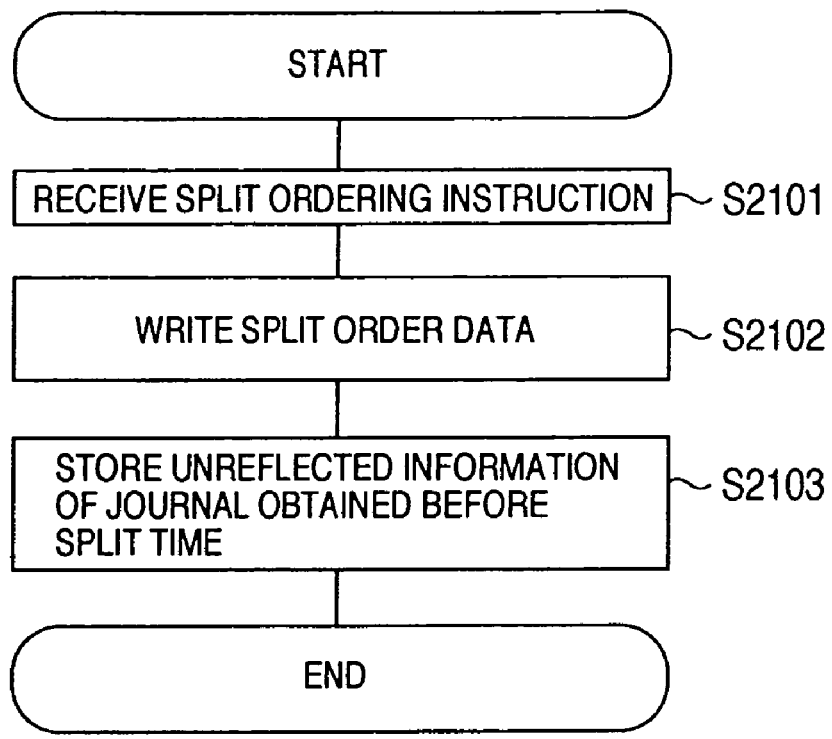
FIG. 21 is a flow chart showing processing conducted when a disk control apparatus has received a split ordering instruction, according to the embodiment.

FIG. 21 is a flow chart showing processing conducted when the disk control device 110 has received a split ordering instruction.

The split ordering instruction reception unit 1305 receives a split ordering instruction from the database server 40, the backup server 1801 or the like (S2101). The split order storage unit 1307 writes split order data into the third storage device 1203 (S2102). Generation of the split order data is conducted as described below. The split order storage unit 1307 sets the group ID specified by the split ordering instruction in the "group ID" in the split order data. The split order storage unit 1307 adds one to the sequence ID provided last time in the group ID, and sets a result in the "sequence ID" in the split order data. The split order storage unit 1307 acquires the current date and hour from the clock device 1204, and sets the acquired current date and hour in the "update time" in the split order data. The split order storage unit 1307 sets data indicating that a split order instruction has been received in the "update location information" in the split order data.

The unreflected information storage unit 1309 stores unreflected information, which is the update location information in the journal data 1701 earlier in update time than the split time, in the memory 1003 (S2103). By the way, the determination whether the update time is earlier than the split time may be conducted by conducting the direct comparison of the update time or may be conducted by conducting comparison of the sequence ID.

==Split Cancel==

Figure 22:
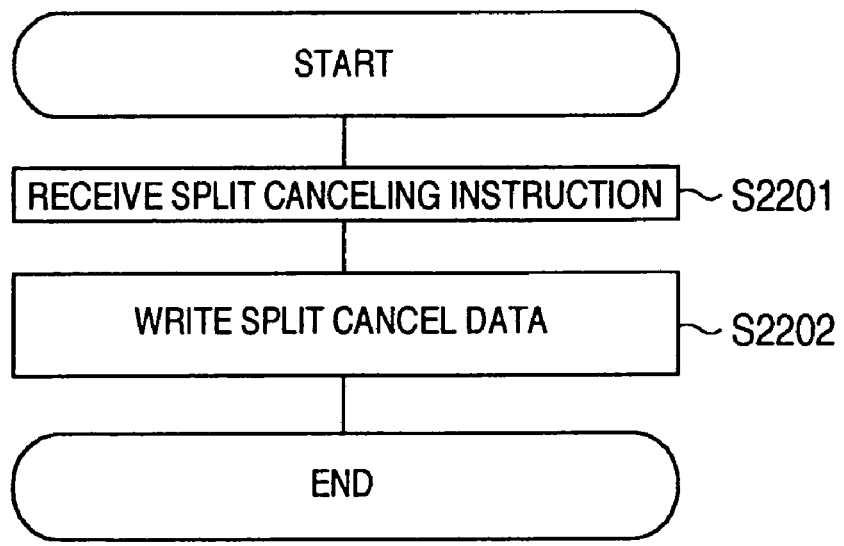
FIG. 22 is a flow chart showing processing conducted when a disk control apparatus has received a split canceling instruction, according to the embodiment.

FIG. 22 is a flow chart showing processing conducted when the disk control device 110 has received a split canceling instruction.

The split canceling instruction reception unit 1306 receives a split canceling instruction from the database server 40, the backup server 1801 or the like (S2201). The split cancel storage unit 1308 writes split cancel data into the third storage device 1203 (S2202). In other words, the split cancel storage unit 1308 sets data indicating that a split canceling instruction has been received in the "update location information" in the split order data having a group ID specified by the split ordering instruction and set therein.

==Reflection of Update Data into Second Storage Device==

Figure 23:
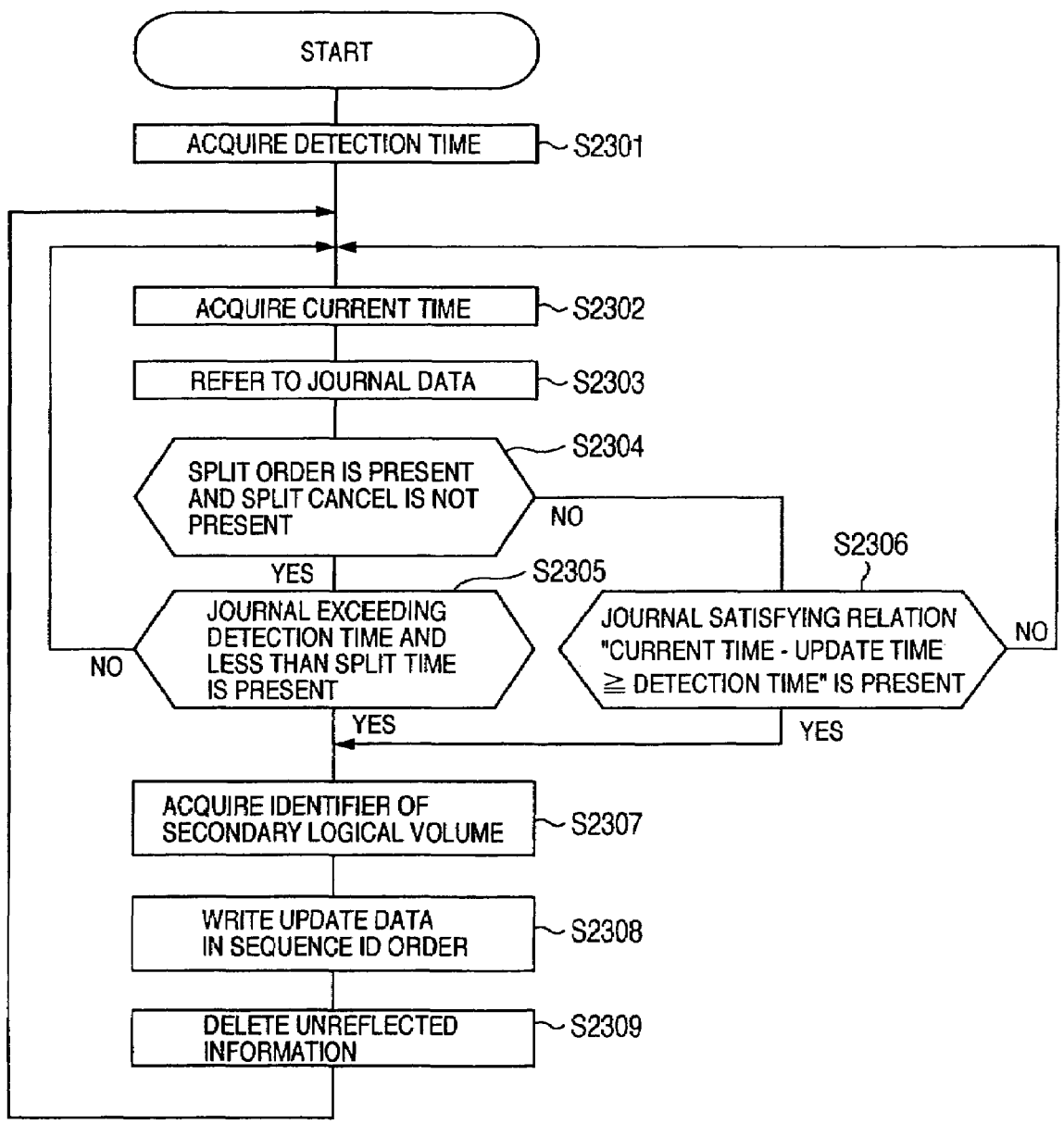
FIG. 23 is a flow chart showing processing conducted when a disk control apparatus reflects journal data to the second storage device, according to the embodiment.

FIG. 23 is a flow chart showing processing of reflecting the update data stored in the third storage device 1203 into the second storage device 1202 conducted by the disk control device 110.

The second write unit 1304 acquires the detection time 1205 stored in the memory 1003 (S2301). The second write unit 1304 acquires the date and hour (current time) from the clock device 1204 (S2302). The second write unit 1304 refers to the journal data 1701 stored in the third storage device 1203 (S2303), and determines whether there is split order data and there is no split cancel data (S2304).

If there is split order data and there is no split cancel data as determined in S2304, the second write unit 1304 selects journal data for which the split ordering data and the group ID are the same, the difference between the update time and the current time exceeds the detection time 1205, and the update time is earlier than the split time (S2305) to proceed to Step 2307 and beyond. However, if journal data 1701 meeting the conditions is not present, processing beginning with S2302 is executed again. If there is no split order data or there is split cancel data as determined in S2304, the second write unit 1304 selects journal data 1701 for which a difference between the update time and the current time exceeds the detection time 1205 (S2306) to proceed to Step 2307 and beyond.

However, if journal data 1701 meeting the conditions is not present, processing beginning with S2302 is executed again.

For processing continuing with S2307, the second write unit 1304 acquires an identifier of a secondary logical volume corresponding to an identifier of the logical volume 121 set in the update location information of the selected journal data 1701 from the pair management table 1501 (S2307). The second write unit 1304 writes update data of the selected journal data 1701 into a place which is included in the logical volume 121 in the second storage device 1202 indicated by the acquired identifier in the secondary logical volume and which is indicated by location information in the journal data 1701 (S2308). If there are a plurality of selected journal data 1701, the second write unit 1304 writes the update data of the selected journal data 1701 into the logical volume 121 in the second storage device 1202 in the order of sequence IDs, i.e., in the order of update times. If writing into the logical volume 121 in the second storage device 1202 is completed, the second write unit 1304 deletes unreflected information of the update data stored in the memory 1003 (S2309).

By changing the S2305 step so as to make the second write unit 1304 select journal data earlier in update time than the split time without comparing the update time with the current time, the second storage device 1202 can be used as static data of the first storage device 1201.

==Readout of Virtual Logical Volume==

Figure 24:
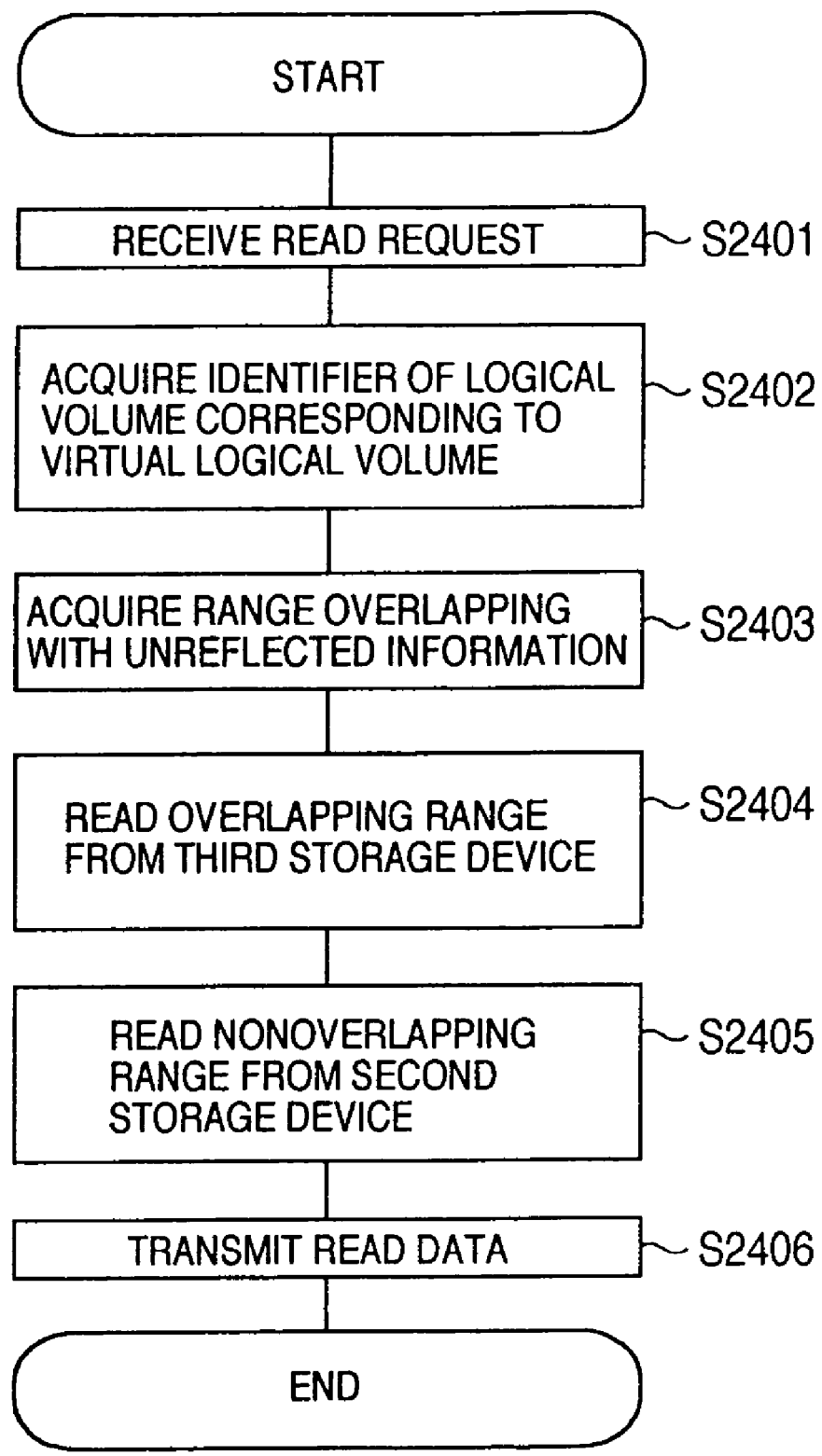
FIG. 24 is a flow chart showing processing conducted when a disk control apparatus has received a read request for a virtual logical volume, according to the embodiment.

FIG. 24 is a flow chart showing processing conducted when the disk control device 110 has received a read request for a virtual logical volume in the virtual device 1801.

The read request reception unit 1310 receives a read request in which an identifier of a virtual logical volume in the virtual device 1801 is specified, from the backup server 1802 (S2401). The identifier acquisition unit 1311 acquires an identifier of the logical volume 121 corresponding to an identifier of a virtual logical volume specified by a read request, from the virtual logical volume management table 1901 (S2402). The overlap range acquisition unit 1312 acquires an overlap range of location information specified by the read request and location information in the unreflected information stored in the memory 1003 (S2403). If the unreflected information is indicated by the start address and the block length, the overlap range is an overlapping portion of the range indicated by the location information specified by the read request and the range indicated by the location information in the in the unreflected information. If the unreflected information is represented by a bit map with a segment taken as the unit, the overlap range is segments which are included in the range indicated by location information specified by the read request and for which the nonreflection bit is set in the bit map of the unreflected information.

The virtual logical volume read unit 1313 reads out an overlapping range from journal data 1701 stored in the third storage device 1203 (S2404). As for a nonoverlapping range, the virtual logical volume read unit 1313 reads it from the logical volume 121 in the second storage device 1202 (S2405). And the read data transmission unit 1314 transmits the read data to the backup server 1802 (S2406).

Heretofore, operation of the units 1301 to 1314 in the disk control device 110 for implementing the backup scheme in the present embodiment has been described.

As a result, the logical volume 121 in the second storage device 1202 can be brought into the state that the logical volume 121 in the first storage device 1201 assumed the detection time 1205 earlier. If illegal data has been written into the logical volume 121 in the first storage device 1201, the illegal data is not written into the logical volume 121 in the second storage device 1202 during the detection time 1205.

For example, it is now supposed that an information processing apparatus 20 is the database server 40 and the logical volume 121 in the first storage device 1201 is a data storage area of the database. In such a case, the database server 40 stores a REDO log for data written into the logical volume 121 in the first storage device 1201 beginning from a certain point in time, in a different storage area. If illegal data has been written into the logical volume 121 in the first storage device 1201, therefore, the logical volume 121 in the first storage device 1201 can be restored to the state obtained immediately before illegal data is written, by using the data obtained the detection time 1205 earlier and stored in the logical volume 121 in the second storage device 1202 and using the REDO log. In other words, data in the logical volume 121 in the first storage device 1201 can be restored by using the data in the disk array apparatus 10 without using data preserved on a medium such as magnetic tape. Therefore, the time required for the restoration work can be shortened.

As compared with the conventional data backup scheme in which the logical volume 121 in the first storage device 1201 is used as primary logical volume and two secondary logical volumes (replica volumes) for the primary logical volume are provided, the storage capacity can be reduced. In the conventional data backup scheme in which two secondary logical volumes are provided, the primary logical volume and the secondary logical volumes need a storage capacity which is three times the storage capacity of the first storage device 1201. The storage capacity needed in the present invention scheme depends upon the quantity of the journal data stored in the third storage device 1203. Typically, in many cases, the database update quantity per day is less than 20% of the primary logical volume. In other words, if the detection time 1205 is set equal to one day, it is sufficient for the third storage device 1203 to have 25% of the storage capacity of the first storage device 1201. Therefore, it is sufficient for the first storage device 1201, the second storage device 1202 and the third storage device 1203 to have a storage capacity which is 2.25 times that of the first storage device 1201. If the detection time 1205 can be set equal to several hours, the necessary storage capacity can be further decreased. In other words, in the backup scheme in which when a fault has occurred the logical volume 121 in the first storage device 1201 is restored by using data present in the disk array apparatus 10, the required storage capacity can be reduced and the introduction of the disk array apparatus 10 can be reduced.

Since the detection time 1205 is stored in the memory 1003, it becomes possible to register the detection time 1205 from the management terminal 136, the information processing apparatus 20, or the like. In other words, the time required to detect that illegal data has been written into the logical volume 121 in the first storage device 1201 because of a trouble in software or an artificial operation mistake can be altered according to the characteristics of the business or software. Therefore, the storage capacity required to store the journal data 1701 in the third storage device 1203 can be altered according to the characteristics of the business or software.

A hard disk drive 120 forming the first storage device 1201 can be made physically different from a hard disk drive 120 forming the second storage device 1202. Even if a hardware fault has occurred in the hard disk drive 120 forming the first storage device 1201, data stored in the logical volume 121 in the first storage device 1201 the detection time 1205 earlier is stored in the second storage device 1202. If the information processing apparatus 20 is the database server 40 and the REDO log written into the logical volume 121 in the first storage device 1201 is present in the disk array apparatus 10, then the data in the logical volume 121 in the first storage device 1201 can be restored by using the logical volume 121 in the second storage device 1202 and the REDO log. Since data preserved on a medium such as magnetic tape is not used for data restoration, the time required for restoration work can be shortened.

In other words, the data in the logical volume 121 in the first storage device 1201 can be restored quickly by using the continuously updated second storage device 1202, without using static data in the logical volume 121 in the first storage device 1201 at a certain point in time.

Furthermore, a hard disk drive 120 forming the first storage device 1201 can be made physically different from hard disk drives 120 forming the second storage device 1202 and the third storage device 1203. When updating the logical volume 121 in the second storage device 1202 by using the journal data 1701 stored in the third storage device 1203, it is not necessary to read out data from the first storage device 1201. In other words, the influence on the performance of the data input/output processing conducted from the information processing apparatus 20 to the first storage device 1201 is slight.

If a hardware fault has occurred in a hard disk drive 120 included in the first storage device 1201, the data in the logical volume 121 in the first storage device 1201 can be restored by using the logical volume 121 in the second storage device 1202 and the journal data 1701 stored in the third storage. In this case as well, data preserved on a medium such as magnetic tape is not used for data restoration, and consequently the time required for the restoration work can be shortened.

After the detection time has elapsed from the split time, it becomes possible to create the state of the first storage device 1201 at the split time on the second storage device 1202. In this state, it becomes possible to back up the logical volume 121 in the second storage device 1202 on a storage medium such as magnetic tape. Therefore, it becomes possible to back up data by way of precaution against a fault over the whole disk array apparatus 10, a wide area disaster, or the like.

Immediately after the split order, it is possible to back up data in the logical volume 121 in the first storage device 1201 at the split time, on magnetic tape or the like by using the virtual logical volume in the volume 121 in the second storage device 1202. In other words, it is not necessary to wait for reflection of the journal data stored in the third storage device 1203 having the update time earlier than the split time into the logical volume in the second storage device 1202. As a result, it becomes possible to back up data easily.

Upon receiving the split ordering instruction, it is also possible to reflect the update data of the journal data having the update time earlier than the split time into the logical volume 121 in the second storage device 1202 irrespective of the detection time. As a result, it is possible to back up data in the logical volume 121 in the first storage device 1201 at the split time, on magnetic tape or the like by using the logical volume 121 in the second storage device 1202. In other words, since it is not necessary to form a virtual logical volume during the back up processing, the load on the disk array apparatus 10 is lightened and the backup processing time is shortened.

The split ordering instruction can be given by specifying a group ID in the logical volume 121 in the first storage device 1201. In the case where a plurality of information processing apparatuses 20 are using the first storage device 1201 or a plurality of business applications are running on an information processing apparatus 20, it becomes possible to back up data by taking a group ID as the unit by giving a group ID to the logical volume 121 every information processing apparatus 20 or business application.

For example, it is now supposed that the information processing apparatus is the database server and there are two database instances used by the database server. Different group IDs are given to the logical volumes 121 in the first storage device 1201 used as data storage areas by the database instances. The split ordering instruction and the split canceling instruction are issued by taking the group ID as the unit. In other words, it becomes possible to back up data by taking the database instance as the unit. Furthermore, for example, if logical volumes 121 in use are different from business application to business application, it becomes possible to back up data by taking business application as the unit.

Also in the case where the group ID is considered, it is possible to back up data in the logical volume 121 in the first storage device 1201 at the split time, on magnetic tape or the like by using a virtual logical volume for the group ID. In other words, before starting backup, it is not necessary to wait for reflection of the journals data stored in the third storage device having update time earlier than the split time into the logical volume in the second storage device. As a result, it becomes possible to conduct data backup easily.

Also in the case where the group ID is considered, upon receiving the split ordering instruction, it is also possible to reflect the update data of the journal data having the update time earlier than the split time into the logical volume 121 in the second storage device 1202, for the group ID irrespective of the detection time. As a result, it is possible to back up data in the logical volume 121 in the first storage device 1201 at the split time, on magnetic tape or the like by using the logical volume 121 in the second storage device 1202. In other words, since it is not necessary to form a virtual logical volume during the back up processing, the load on the disk array apparatus 10 is lightened and the backup processing time is shortened.

Heretofore, the present embodiment has been described. The embodiment has been shown to facilitate appreciation of the present invention, and it is not intended to limit and construe the present invention. The present invention can be modified and improved without departing from the spirit thereof, and the present invention includes equivalents thereof.

What is claimed is:

1. A disk array system connected with a plurality of host computers via a network, comprising:

a disk control apparatus; and a plurality of hard disk drives configured into at least a first logical volume and a second logical volume, wherein the disk control apparatus stores a plurality of sets of update data, each set of which includes at least one byte of data and is written at a respective update time into the first logical volume in response to a respective update request sent from one of said host computers, whenever a difference period between said respective update time of one set of the plurality of sets of update data and a current time point exceeds a length of a predetermined time period, the disk control apparatus relocates said one set of update data stored in the first logical volume and stores said one set of relocated update data only into the second logical volume, said respective update time of the one set of relocated update data is a prior time point earlier than the current time point, the difference period between the prior time point and the current time point is equal to or longer than the length of the predetermined time period, and only some sets of the plurality of sets of update data, which are stored in the first logical volume in response to a plurality of said update requests sent during the predetermined time period, remain in the first logical volume as of the current time point, and the disk control apparatus provides a virtual volume in response to receiving a split order at a split time point, and maps the virtual volume to both the second logical volume stored only with a plurality of said one set of relocated update data as are at the split time point and the first logical volume stored only with a plurality of said one set of update data written thereinto as are at the split time point, wherein the split time point is equal to or earlier than the current time point.

2. A disk array system according to claim 1, wherein at least one of the host computers is configured to write said one set of update data into the first logical volume, and at least another one of the host computers is configured to read the said one set of update data from said first logical volume and said one set of relocated update data from the second logical volume.

3. A disk array system according to claim 1, wherein the disk control apparatus includes a plurality of channel interface units, a plurality of disk control units, a cache memory, a switching control unit operatively connected to the channel interface units, the disk control units and the cache memory, and the first and second logical volumes are each operatively connected to corresponding ones of the plurality of disk control units.

4. A disk array system according to claim 1, wherein the first logical volume is configured to periodically reflect a plurality of said one set of update data stored in the first logical volume to the second logical volume at predetermined time intervals, the predetermined time intervals are a fixed time interval or variable time intervals.

5. A disk array system according to claim 4, wherein said disk control apparatus is configured to manage the plurality of said one set of update data in the first logical volume and the periodic reflecting of the plurality of said one set of update data to the second logical volume at said predetermined time intervals.

6. A disk array system according to claim 4, wherein the cache memory is configured to store information on time data for at least the second logical volume to store the plurality of said one set of update data reflected from the first logical volume.

7. A disk array system according to claim 1, wherein the first and second logical volumes are configured to restore a plurality of said one set of update data in the first logical volume or a plurality of said one set of relocated update data in the second logical volume when a fault occurs.

8. A disk array system according to claim 1, wherein the plurality of hard disk drives are configured into the first logical volume and a plurality of the second logical volumes.

9. A disk array system according to claim 1, wherein while the virtual volume is being provided, the disk control apparatus continues to relocate said one set of update data stored in the first logical volume and stores said one set of relocated update data into the second logical volume.

10. A disk array system according to claim 9, wherein the disk control apparatus continues relocating said one set of update data from the first logical volume into the second logical volume when receiving a split cancelling order.

11. A disk array system according to claim 1, wherein the disk control apparatus recovers a third logical volume by using a plurality of said one set of relocated update data stored in the second logical volume and a plurality of said one set of update data stored in the first logical volume when a fault occurs in the third logical volume.

12. A method of operation for a disk array system connected with a plurality of host computers via a network, said disk array system having a disk control apparatus, and a plurality of hard disk drives configured into at least a first logical volume and a second logical volume, the method comprising the steps of:

storing a plurality of sets of update data, each set of which includes at least one byte of data and is written at a respective update time into the first logical volume in response to a respective update request sent from one of said host computers; and whenever a difference period between said respective update time of one of the plurality of the update data and a current time point exceeds a length of a predetermined time period, relocating said one set of update data stored in the first logical volume and stores said one set of relocated update data only into the second logical volume, said respective update time of the one set of relocated update data is a prior time point earlier than the current time point, the difference period between the prior time point and the current time point is equal to or longer than the length of the predetermined time period, and only some sets of a plurality of sets of update data, which are stored in the first logical volume in response to the plurality of said update requests during the predetermined time period, remain in the first logical volume as of the current time point, and providing a virtual volume in response to receiving a split order at a split time point, and mapping the virtual volume to both the second logical volume stored only with a plurality of said one set of relocated update data as are at the split time point and the first logical volume stored only with a plurality of said one set of update data written thereinto as are at the split time point, wherein the split time point is equal to or earlier than the current time point.

13. A method according to claim 12, further comprising the steps of:

at least one of the host computers writing said one set of update data into the first logical volume; and at least another one of the host computers reading said one set of update data from the first logical volume and said one set of relocated update data from the second logical volume.

14. A method according to claim 12, wherein the disk control apparatus includes a plurality of channel interface units, a plurality of disk control units, a cache memory, a switching control unit operatively connected to the channel interface units, the disk control units and the cache memory, and the first and second logical volumes are each operatively connected to corresponding ones of the plurality of disk control units.

15. A method according to claim 12, further comprising a step of periodically reflecting a plurality of said one set of update data in the first logical volume to the second logical volume at a fixed time interval or at variable time intervals.

16. A method according to claim 15, further comprising the step of:

managing the plurality of said one of update data in the first logical volume and the periodic reflecting of the plurality of said one set of update data to the second logical volume at the fixed time interval or at said variable time intervals.

17. A method according to claim 15, further comprising the step of:
  storing time data for at least the second logical volume to store the plurality of said one set of update data reflected from the first logical volume in the cache memory.

18. A method according to claim 12, further comprising the step of:
  restoring a plurality of said one set of update data in the first logical volume or a plurality of said one set of relocated update data in the second logical volume when a fault occurs.

19. A method according to claim 12, further comprising the step of:
  while the virtual volume is being provided, continuing to relocate said one set of update data stored in the first logical volume and stores said one set of relocated update data into the second logical volume.

20. A method according to claim 19, further comprising the step of:
  continuing relocating said one set of update data from the first logical volume into the second logical volume when receiving a split cancelling order.

21. A method according to claim 12, further comprising:
recovering a third logical volume by using a plurality of said one set of relocated update data stored in the second logical volume and a plurality of said one set of update data stored in the first logical volume when a fault occurs in the third logical volume.

22. A disk array system connected with a plurality of host computers via a network, comprising:
  a disk control apparatus; and
  a plurality of hard disk drives configured into at least a first logical volume and a second logical volume, wherein
  the disk control apparatus stores a plurality of sets of update data from a starting time up to a current time point into the first logical volume, each set of the plurality of update data including at least one byte of data and being updated into a corresponding location in the first logical volume at a respective update time in response to a respective update request sent from one of said host computers, and
  the disk control apparatus maintains only a group of update data containing only some sets of the plurality of sets of update data in the second logical volume which were updated into the first logical volume during a period from the starting time up to a prior time point, the prior time point is earlier than said current time point by a length of a predetermined time period, the disk control apparatus relocates at said current time point into the second logical volume one set of the group of update data whenever a difference between a respective update time of said one set of update data and said current time point exceeds the length of said predetermined time period, and the group of update data, which are stored into the first logical volume in response to a plurality of said respective update requests sent prior to and at the prior time point, are maintained in the second logical volume as of the current time point, and
  the disk array system further comprises a third logical volume, wherein the disk control apparatus maintains another group of update data containing only some sets of the plurality of sets of update data other than the group of update data in the third logical volume, said another group of update data which were relocated into the third logical volume during said prior time point up to said current time point, and the disk control apparatus recovers the first logical volume by using both the group of update data stored in the second logical volume and said another group of update data stored in the third logical volume when a fault occurs in the first logical volume.

* * * * *